(12) United States Patent
Mather et al.

(10) Patent No.: US 9,249,254 B2
(45) Date of Patent: Feb. 2, 2016

(54) POLYHEDRAL OLIGOMERIC SILSESQUIOXANE POLYURETHANES

(75) Inventors: Patrick Mather, Syracuse, NY (US); Jian Wu, Homer, PA (US); Xinzhu Gu, Homer, NY (US)

(73) Assignee: Syracuse University, Syracuse, NY (US)

( * ) Notice: Subject to any disclaimer, the term of this patent is extended or adjusted under 35 U.S.C. 154(b) by 1274 days.

(21) Appl. No.: 13/092,331

(22) Filed: Apr. 22, 2011

(65) Prior Publication Data

US 2011/0263808 A1 Oct. 27, 2011

Related U.S. Application Data

(60) Provisional application No. 61/326,762, filed on Apr. 22, 2010.

(51) Int. Cl.
  C08G 18/77 (2006.01)
  C08G 18/40 (2006.01)
  C08G 18/38 (2006.01)
  C08G 18/42 (2006.01)
  C08G 18/48 (2006.01)
  C08G 18/61 (2006.01)

(52) U.S. Cl.
  CPC .......... *C08G 18/771* (2013.01); *C08G 18/3893* (2013.01); *C08G 18/4018* (2013.01); *C08G 18/4277* (2013.01); *C08G 18/4833* (2013.01); *C08G 18/61* (2013.01); *C08G 2230/00* (2013.01)

(58) Field of Classification Search
  CPC .......... C08G 18/3893; C08G 18/4018; C08G 18/4833; C08G 18/61
  See application file for complete search history.

(56) References Cited

U.S. PATENT DOCUMENTS

| | | | | |
|---|---|---|---|---|
| 7,091,297 | B2 * | 8/2006 | Mather et al. | 528/28 |
| 7,524,914 | B2 * | 4/2009 | Mather et al. | 528/28 |
| 2004/0024098 | A1 * | 2/2004 | Mather et al. | 524/268 |
| 2005/0251249 | A1 * | 11/2005 | Sahatjian et al. | 623/1.46 |
| 2011/0059527 | A1 * | 3/2011 | Mather et al. | 435/395 |

OTHER PUBLICATIONS

Joanne Raghunath, et al., Degradation studies on biodegradable nanocomposite based on polycaprolactonel polycarbonate (80:20%) polyhedral oligomeric silsesquioxane, Journal of Biomedical Materials Research Part A, published online Dec. 2, 2008 in Wiley InterScience (www.interscience.wiley.com). DOI 10.1002/jbm.a. 32335.

Qiongyu Guo., et al., Tailored drug release from biodegradable stent coatings based on hybrid polyurethanes, Apr. 2009, Journal of Controlled Release 137 (2009), see pp. 224-226.

(Continued)

*Primary Examiner* — Michael L Leonard
(74) *Attorney, Agent, or Firm* — David L. Nocilly; George R. McGuire; Bond Schoeneck & King, PLLC

(57) ABSTRACT

A multi-block thermoplastic polyurethanes system which incorporates polyhedral oligomeric silsesquioxane into conventional biodegradable thermoplastic polyurethanes built up by poly(ε-caproactone) and polyethylene glycol blocks, resulting in biostability. The multi-block thermoplastic polyurethanes are synthesized from lysine-diisocyanate with poly (ε-caprolactone)-diol, polyhedral oligomeric silsesquioxane-diol, and poly(ethylene glycol) using a one-step synthesis process.

22 Claims, 21 Drawing Sheets

(56) References Cited

OTHER PUBLICATIONS

Yonghong, Liu, et al., Polyurethane Networks Modified with Octa(propylglycidyl ether) Polyhedral Oligomeric Silsesquioxane, Oct. 2006, Wiley InterScience, 2006 Wiley-VCH Vering GmbH & Co. KGaA, Weinheim, see whole document.

D Gnanasekaran, et al. Developments of polyhedral oligomeric silsesquioxanes (PoSS), poss nanocomposites and their applications, Jun. 2009, Journal of Scientific & Industrial Research, vol. 68, Jun. 2009, pp. 437-464, see the whole document.

* cited by examiner

| Materials | PEG/PCL/POSS feed ratio, w/w/w (mol/mol/mol) | PEG/PCL/POSS[a] Actual ratio, w/w/w (mol/mol/mol) | $M_n$[b] (kg/mol) | PDI |
|---|---|---|---|---|
| [PCL$_{10k}$]$_{100}$ | 0/100/0 (0/100/0) | 0/100/0 (0/100/0) | 66.2 | 1.18 |
| [PEG$_{10k}$]$_{50}$-[PCL$_{1k}$]$_{50}$ | 50/50/0 (11/89/0) | 51/49/0 (11/89/0) | 100.8 | 1.22 |
| [PEG$_{1k}$]$_{50}$-[PCL$_{1k}$]$_{50}$ + 20wt% POSS | 40/40/20 (7/57/36) | 37/35/28 (6/48/46) | | |
| [PEG$_{1k}$]$_{50}$-[PCL$_{1k}$]$_{30}$-[POSS]$_{20}$ | 50/30/20 (56/22/22) | 50/29/21 (56/22/22) | 217.4 | 1.19 |
| [PEG$_{10k}$]$_{50}$-[PCL$_{1k}$]$_{30}$-[POSS]$_{20}$ | 50/30/20 (11/44/44) | 61/24/15 (16/49/35) | 51.9 | 1.08 | a: based on $^1$H-NMR
b: based on light scattering from GPC

FIG. 3

| Materials | $T_g$ (°C) | $T_m^{PEG}$ (°C) [$\Delta H_{m,PEG}$ (J/g)] | $T_m^{POSS}$ (°C) [$\Delta H_{m,POSS}$ (J/g)] | $T_m^{PCL}$ (°C) [$\Delta H_{m,PCL}$ (J/g)] | Water uptake (%) |
|---|---|---|---|---|---|
| [PCL$_{4k}$]$_{100}$ | -62.5 | | | 55.2 [60.7] | 0 |
| [PEG$_{10k}$]$_{50}$-[PCL$_{1k}$]$_{50}$ | -48.7 | 48.9 [61.8] | | | 179.1 |
| [PEG$_{10k}$]$_{50}$-[PCL$_{1k}$]$_{50}$ + 20wt% POSS | -49.9 | 49.6 [48.6] | 123.1 [4.4] | | 164.4 |
| [PEG$_{1k}$]$_{50}$-[PCL$_{1k}$]$_{30}$-[POSS]$_{20}$ | -48.2 | | 107.0 [1.9] | | 70.7 |
| [PEG$_{10k}$]$_{50}$-[PCL$_{1k}$]$_{30}$-[POSS]$_{20}$ | -48.1 | 46.5 [50.1] | 117.5 [1.4] | | 182.0 |

FIG. 4

| Materials | Young's Moduli (MPa) | Yield Stress (MPa) | Yield Strain (%) | Elongation at Break (%) |
|---|---|---|---|---|
| [PCL$_{4K}$]$_{100}$ | 130.0 ± 14.1 | 16.4 ± 3.4 | 24.5 ± 1.0 | >1200 |
| [PEG$_{10K}$]$_{50}$-[PCL$_{4K}$]$_{50}$ | 44.9 ± 4.4 | 4.6 ± 0.1 | 23.5 ± 2.4 | >1200 |
| [PEG$_{10K}$]$_{40}$-[PCL$_{4K}$]$_{50}$ + 20wt% POSS | 46.4 ± 3.7 | 5.5 ± 0.6 | 17.1 ± 4.8 | >1200 |
| [PEG$_{1K}$]$_{30}$-[PCL$_{1K}$]$_{50}$-[POSS]$_{20}$ | 4.9 ± 0.8 | | | >1200 |
| [PEG$_{20K}$]$_{30}$-[PCL$_{3K}$]$_{50}$-[POSS]$_{20}$ | 69.3 ± 4.1 | 7.6 ± 0.5 | 23.0 ± 3.8 | |

FIG. 8

| Materials | | $T_g$ (°C) | $T_m^{PEG}$ (°C) [$\Delta H^{PEG}$ (J/g)] | $T_m^{POSS}$ (°C) [$\Delta H^{POSS}$ (J/g)] | $T_m^{PCL}$ (°C) [$\Delta H^{PCL}$ (J/g)] |
|---|---|---|---|---|---|
| [PCL$_{40k}$]$_{100}$ | Swelled/dried | -59.7 | | | 63.4 [87.1] |
| | In Lipase | -59.9 | | | 62.7 [91.4] |
| [PEG$_{10k}$]$_{50}$-[PCL$_{1k}$]$_{50}$ | Swelled/dried | -49.0 | 53.3 [60.8] | | |
| | In Lipase | -48.5 | 52.5 [59.6] | | |
| [PEG$_{10k}$]$_{50}$-[PCL$_{1k}$]$_{50}$ + 20wt% POSS | Swelled/dried | -46.6 | 54.4 [47.9] | 122.6 [4.1] | |
| | In Lipase | -48.8 | 53.7 [51.2] | 119.6 [4.1] | |
| [PEG$_{1k}$]$_{50}$-[PCL$_{1k}$]$_{30}$-[POSS]$_{20}$ | Swelled/dried | -48.3 | | 98.8 [0.9] | |
| | In Lipase | -47.5 | | 99.7 [0.9] | |
| [PEG$_{10k}$]$_{50}$-[PCL$_{1k}$]$_{30}$-[POSS]$_{20}$ | Swelled/dried | -43.4 | 53.5 [72.0] | 117.4 [1.4] | |
| | In Lipase | -48.3 | 55.0 [75.9] | 114.3 [1.4] | |

FIG. 20

| Materials | | Moduli (MPa) | Yield Stress (MPa) |
|---|---|---|---|
| [PCL$_{40k}$]$_{100}$ | As Cast | 180.4 ± 24.9 | 12.9 ± 0.1 |
| | In Lipase | 192.7 ± 21.0 | 12.0 ± 0.7 |
| [PEG$_{10k}$]$_{50}$-[PCL$_{1k}$]$_{50}$ | As Cast | 56.3 ± 1.2 | 4.5 ± 0.1 |
| | In Lipase | 54.0 ± 8.6 | 4.3 ± 0.4 |
| [PEG$_{10k}$]$_{50}$-[PCL$_{1k}$]$_{50}$ + 20wt% POSS | As Cast | 59.5 ± 4.0 | 4.1 ± 0.2 |
| | In Lipase | 68.4 ± 10.0 | 4.7 ± 0.4 |
| [PEG$_{1k}$]$_{50}$-[PCL$_{1k}$]$_{30}$-[POSS]$_{20}$ | As Cast | 5.4 ± 0.7 | |
| | In Lipase | 6.5 ± 1.4 | |
| [PEG$_{10k}$]$_{50}$-[PCL$_{1k}$]$_{30}$-[POSS]$_{20}$ | As Cast | 77.8 ± 2.0 | 5.7 ± 0.1 |
| | In Lipase | 78.4 ± 15.1 | 5.4 ± 0.7 |

FIG. 21

POLYHEDRAL OLIGOMERIC SILSESQUIOXANE POLYURETHANES

CROSS-REFERENCE TO RELATED APPLICATIONS

The present application claims priority to U.S. Provisional Application No. 61/326,762, filed on Apr. 22, 2010, which is hereby incorporated by reference in its entirety.

BACKGROUND OF THE INVENTION

1. Field of the Invention

The present invention relates to a multi-block thermoplastic polyurethanes system, and, more specifically, to a system incorporating polyhedral oligomeric silsesquioxane into conventional biodegradable thermoplastic polyurethanes.

2. Description of the Related Art

Biostability is of critical importance for biomaterials applied for long-term medical implants. Thermoplastic polyurethanes ("TPUs") are composed of hard segment and soft segment. The hard segment block consists of a selected diisocyanate and a selected chain extender. The soft segment is usually a polyol, either hydroxyl- or amine-terminated polyester, polyether, or polycarbonate. The flexible soft segment affords the TPUs great elasticity while the hard segment contributes strength. Both segments are incompatible and tend to form phase-separated morphology. Due to their great potential in tailoring polymer structures, polyurethanes have unique mechanical properties and good biocompatibility that make them ideal for many implantable biomedical devices, including artificial hearts components, heart valves, vascular grafts, and mammary prostheses. Since their introduction, many different polyurethanes have been evaluated for their stability in the biological environment using both in vitro and in vivo test procedures. It has been recognized that polyester-based polyurethanes are not suitable for long-term implantation due to their susceptibility to hydrolytic degradation.

Both poly($\epsilon$-caprolactone) ("PCL") and poly(ethylene glycol) ("PEG") are biocompatible and non-immunogenic. So far, there have been several PCL- and/or PEG-based biomedical products for various clinical uses approved by the U.S. Food and Drug Administration ("FDA"). Polycaprolactone is one of the most promising synthetic polymers that can degrade in contact with microorganisms. The related enzymatic hydrolytic degradation of PCL-based polymers has also been investigated, especially in the presence of ester-bond cleavage enzymes. Lipases are among the most popularly studied enzymes to catalyze the cleavage of ester bonds by transesterification. Importantly, semicrystalline PCL blocks make the associated polyurethanes stiff and hydrophobic, limiting its compatibility with soft tissues and the range of potential applications.

Poly(ethylene glycol) is one of the most widely studied synthetic polymers used for designing hydrogels in the biomedical applications. The intrinsic hydrophilicity of PEG-based hydrogels repels nonspecific protein adsorption and resists bacterial and animal cell adhesion. Its elastic and soft natures enable them to have low mechanical and frictional irritation when to contact with tissues and organs. However, PEG-based polyurethanes showed poor mechanical properties. The properties of these polymers can be improved by either blending or copolymerization. Because of the combination of great advantages of PCL and PEG, PCL-PEG-based copolymers might have great potential application in biomedical fields including drug delivery, cell encapsulation, and tissue engineering. A family of new biodegradable segmented polyurethanes with a wide variety of chemical and mechanical properties suitable for use in soft tissue applications has previously been developed. The hard segments of these materials are composed of a phenylalanine-based diester chain extender and a lysine-based diisocyanate. The soft segments are either a PCL or PEG diol. Through blending of PCL and PEG-based polyurethanes, the degradation rate and mechanical properties have been optimized. Due to its vulnerability to hydrolytic and oxidative degradation, PCL-PEG-based copolymers have proven unsuitable for long-term implantation.

Polyhedral oligosilsesquioxane ("POSS") is a class of hybrid molecules with an inorganic silicon-oxygen cage ($Si_8O_{12}$) and eight variable organic side groups pendant to each silicon corner of the cage with the size of 1~3 nm. The silica-like framework renders POSS cages chemically stable, non-toxic, and mechanically robust. Past work on POSS polyurethanes concerned microstructure-deformation studies, biodegradation, controlled drug delivery, and biocompatibility. In vitro hydrolysis and oxidation tests have been conducted in order to assess the degradative resistance of polyhedral oligosilsesquioxane integrated poly(carbonate-urea) urethane (POSS-PCU). These studies revealed that all samples showed no significant difference in their compliance and elasticity after a 70-day hydrolysis and oxidation test, indicating their striking biostability. Thus it was proposed that POSS nanocores covalently incorporated in PCU chains imparts a type of "protective" or "shielding effect" on the soft phase, thereby preserving its elasticity and compliant properties in oxidation and hydrolysis. Polycarbonate-urethane itself, however, possesses a greater biostability than does polyether-urethane and polyester-urethane. How to change polyether- and polyester-based urethanes from a biodegradable form to a biostable form by incorporation of POSS (or other means) has not yet been reported.

BRIEF SUMMARY OF THE INVENTION

It is therefore a principal object and advantage of the present invention to provide biostable polyurethanes by incorporating polyhedral oligomeric silsesquioxane into conventional biodegradable thermoplastic polyurethanes.

Other objects and advantages of the present invention will in part be obvious, and in part appear hereinafter.

In accordance with the foregoing objects and advantages, the present invention provides a novel multi-block thermoplastic polyurethanes system which incorporates polyhedral oligomeric silsesquioxane into conventional biodegradable thermoplastic polyurethanes built up by poly($\epsilon$-caprolactone) and polyethylene glycol blocks. The multi-block thermoplastic polyurethanes are synthesized from lysine-diisocyanate with PCL-diol, POSS-diol and PEG using a one-step technique. The covalently bonded POSS moieties develop a relatively continuous robust POSS-layer after initial degradation, which prevents ester bonds of PCL from enzymatic attack, thereby inhibiting degradation.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 3 is a table of chemical properties of PCL-PEG based multiblock TPUs which are physically or covalently bonded with POSS moieties including PCL-PEG TPUs and [PCL$_{40k}$]$_{100}$ as controls;

FIG. 4 is a table of material properties of PCL-PEG based multiblock TPUs and [PCL$_{40k}$]$_{100}$;

Figure 5:
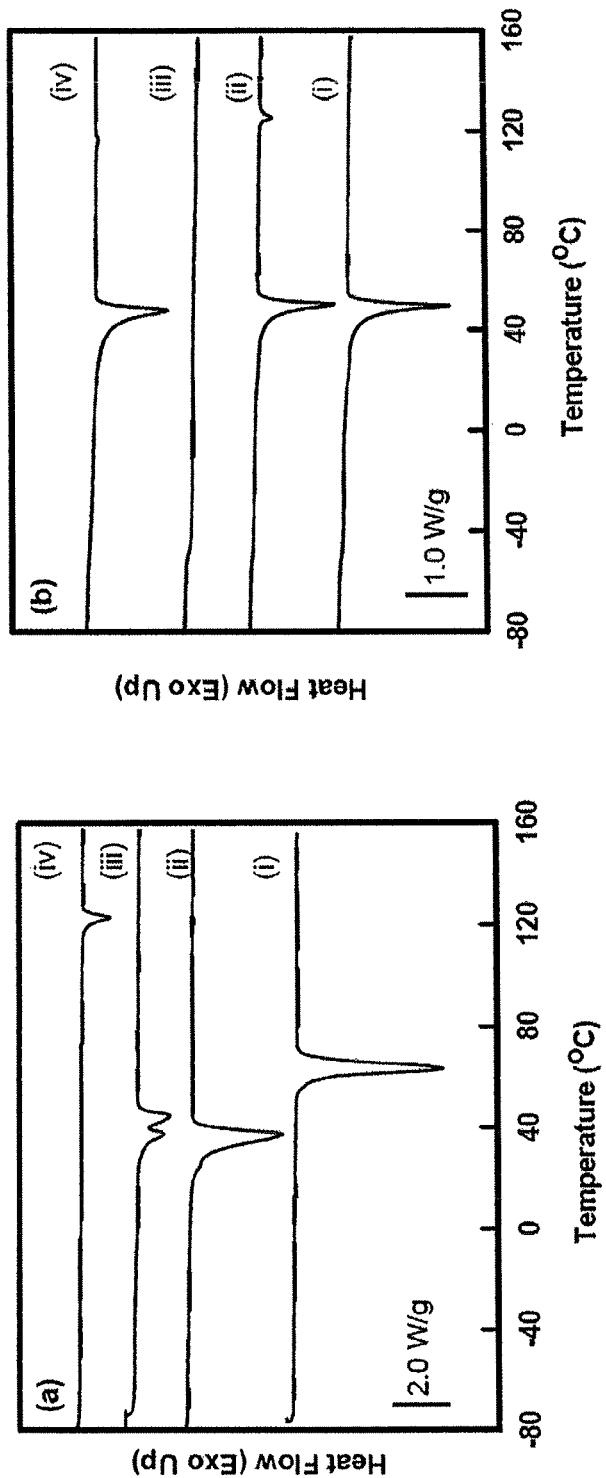

FIG. 5 are graphs of differential scanning calorimetry second heating traces for PCL-PEG based TPUs for (a) the diols used to synthesize PCL-PEG based TPUs: (i) PEG$_{10k}$; (ii) PEG$_{1k}$; (iii) PCL$_{1k}$-diol; (iv) POSS-diol and (b) PCL-PEG based TPUs (i) [PEG$_{10k}$]$_{50}$-[PCL$_{1k}$]$_{50}$; (ii) [PEG$_{10k}$]$_{50}$-[PCL$_{1k}$]$_{50}$+20 wt % POSS; (iii) [PEG$_{1k}$]$_{50}$-[PCL$_{1k}$]$_{30}$-[POSS]$_{20}$; (iv) [PEG$_{10k}$]$_{50}$-[PCL$_{1k}$]$_{30}$-[POSS]$_{20}$.

Figure 6:
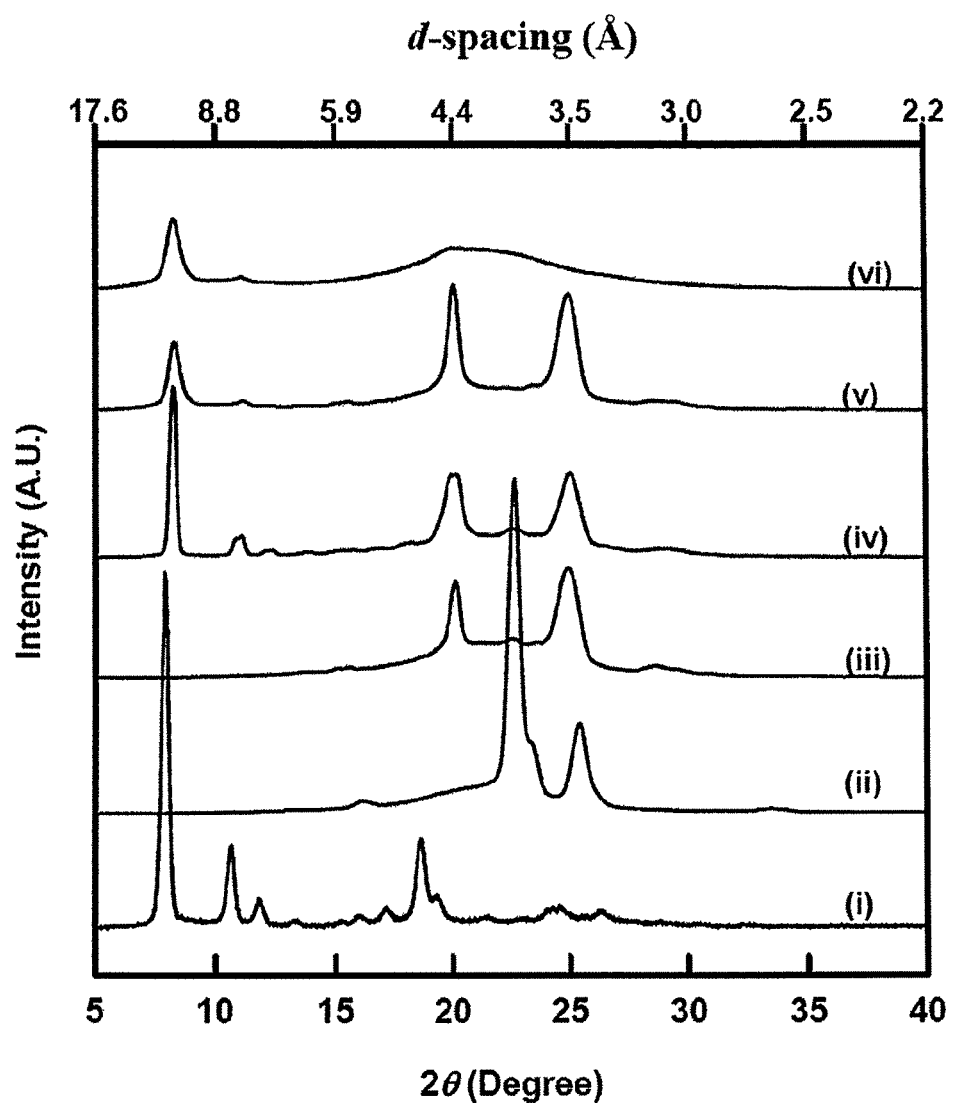

FIG. 6 is a graph of wide angle X-ray diffraction of PCL-PEG based TPUs incorporating the POSS moieties in FIG. 3: (i) POSS-diol monomer; (ii) [PEG$_{42k}$]$_{100}$; (iii) [PEG$_{10k}$]$_{50}$-[PCL$_{1k}$]$_{50}$; (iv) [PEG$_{10k}$]$_{50}$-[PCL$_{1k}$]$_{50}$+20 wt % POSS; (v) [PEG$_{10k}$]$_{50}$-[PCL$_{1k}$]$_{30}$-[POSS]$_{20}$; and (vi) [PEG$_{1k}$]$_{50}$-[PCL$_{1k}$]$_{30}$[POSS]$_{20}$, where the x-ray wavelength is 1.5405 Å.

Figure 7:
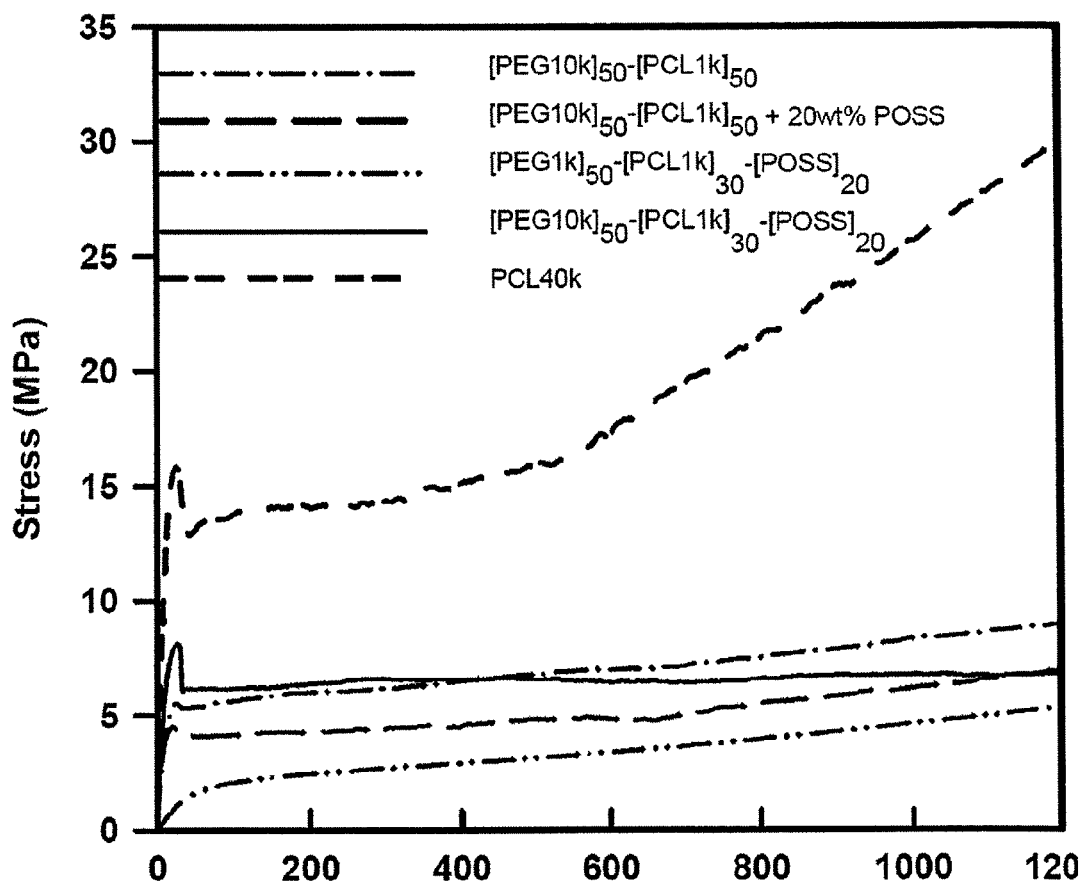
Figure 9:
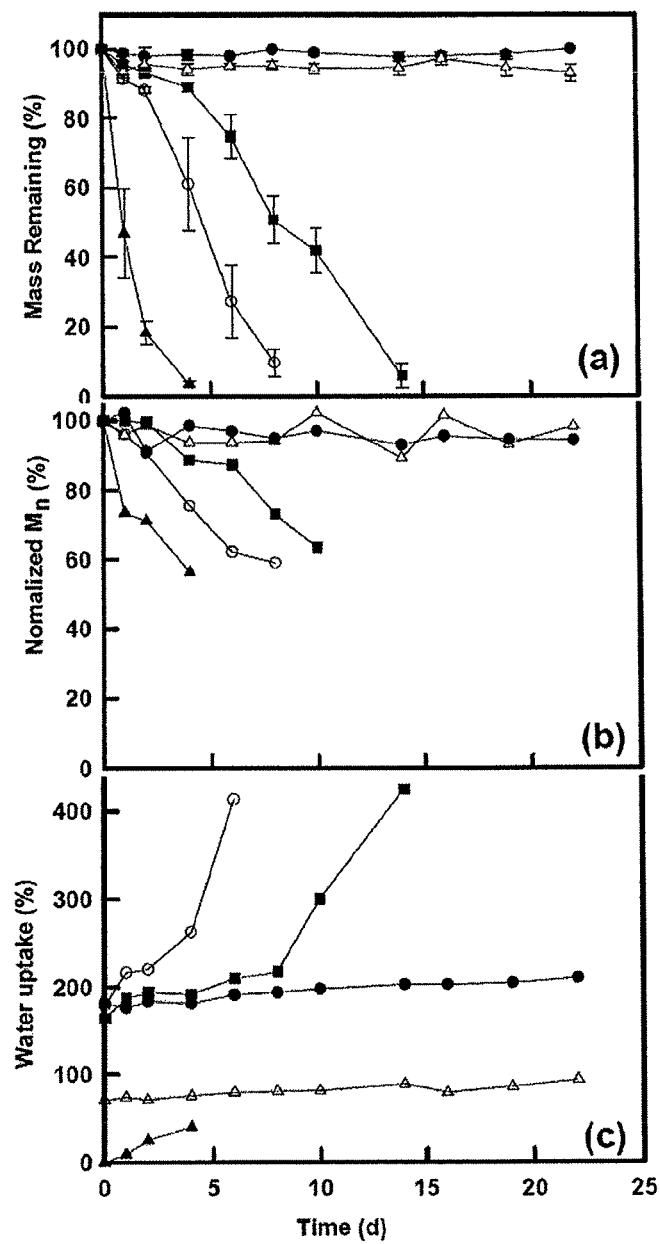
Figure 10:
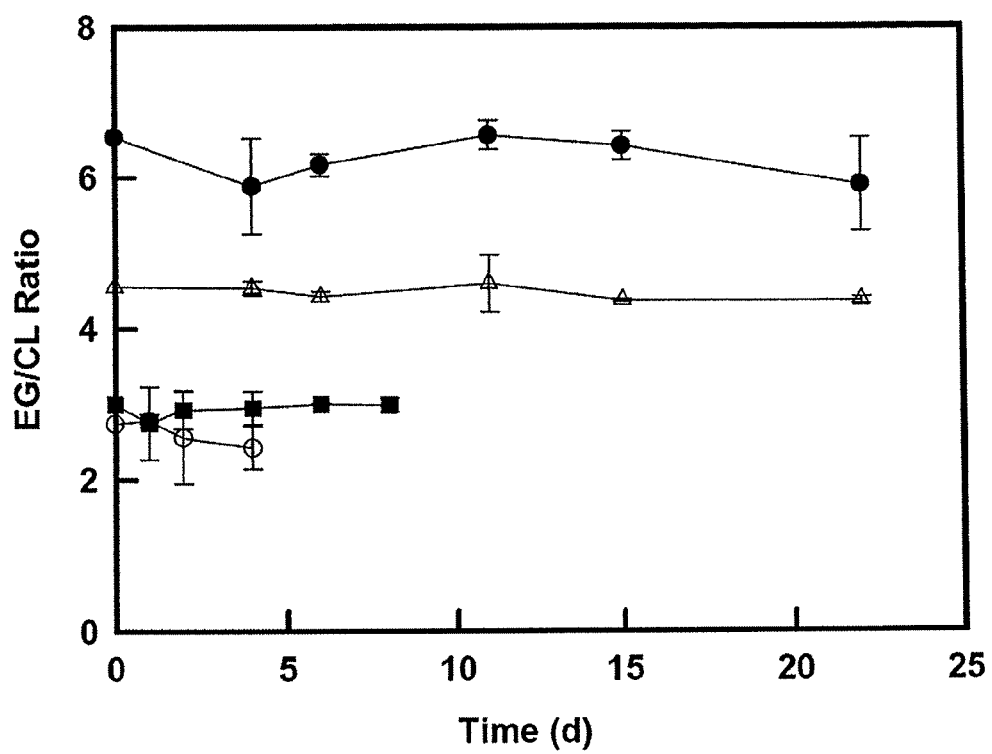
Figure 11:
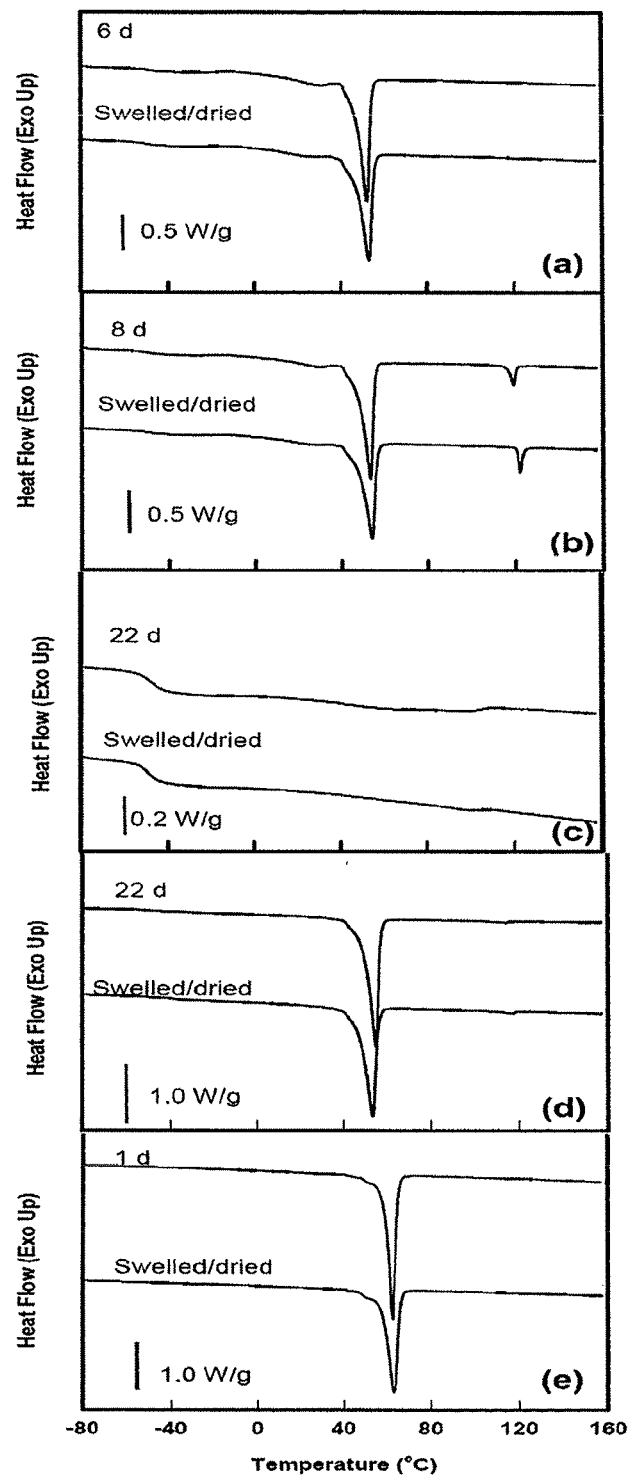

FIG. 7 is a graph of stress/strain response of PCL-PEG based multiblock TPUs and [PCL$_{40k}$]$_{100}$;

FIG. 8 is a table of mechanical properties of PCL-PEG based multiblock TPUs and [PCL$_{10k}$]$_{100}$;

FIG. 9 is a graph of the effects of enzymatic degradation on multiblock TPUs;

FIG. 10 is a graph of $^1$H NMR of four TPUs;

FIG. 11 is a graph of differential scanning calorimetry first heating traces before and after enzymatic degradation for (a) [PEG$_{10k}$]$_{50}$-[PCL$_{1k}$]$_{50}$; (b) [PEG$_{10k}$]$_{50}$-[PCL$_{1k}$]$_{50}$+20 wt % POSS; (c) [PEG$_{10k}$]$_{50}$-[PCL$_{1k}$]$_{30}$-[POSS]$_{20}$; and (d) [PCL$_{40k}$]$_{100}$.

Figure 12:
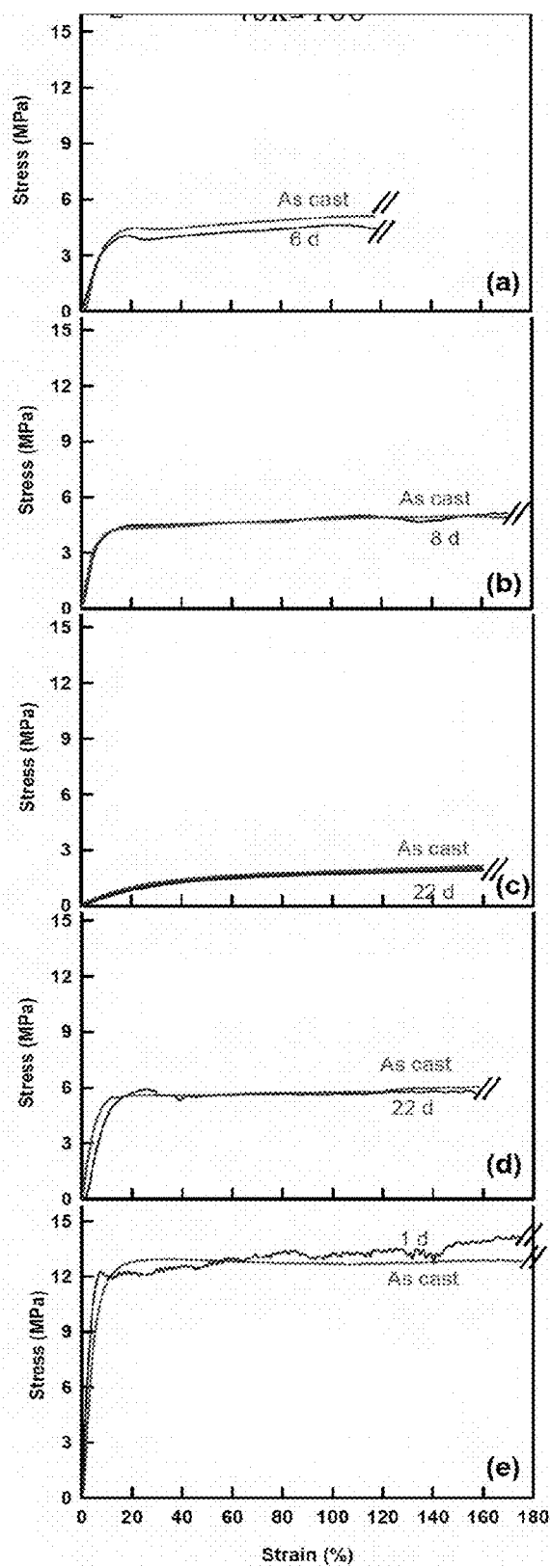
Figure 13:
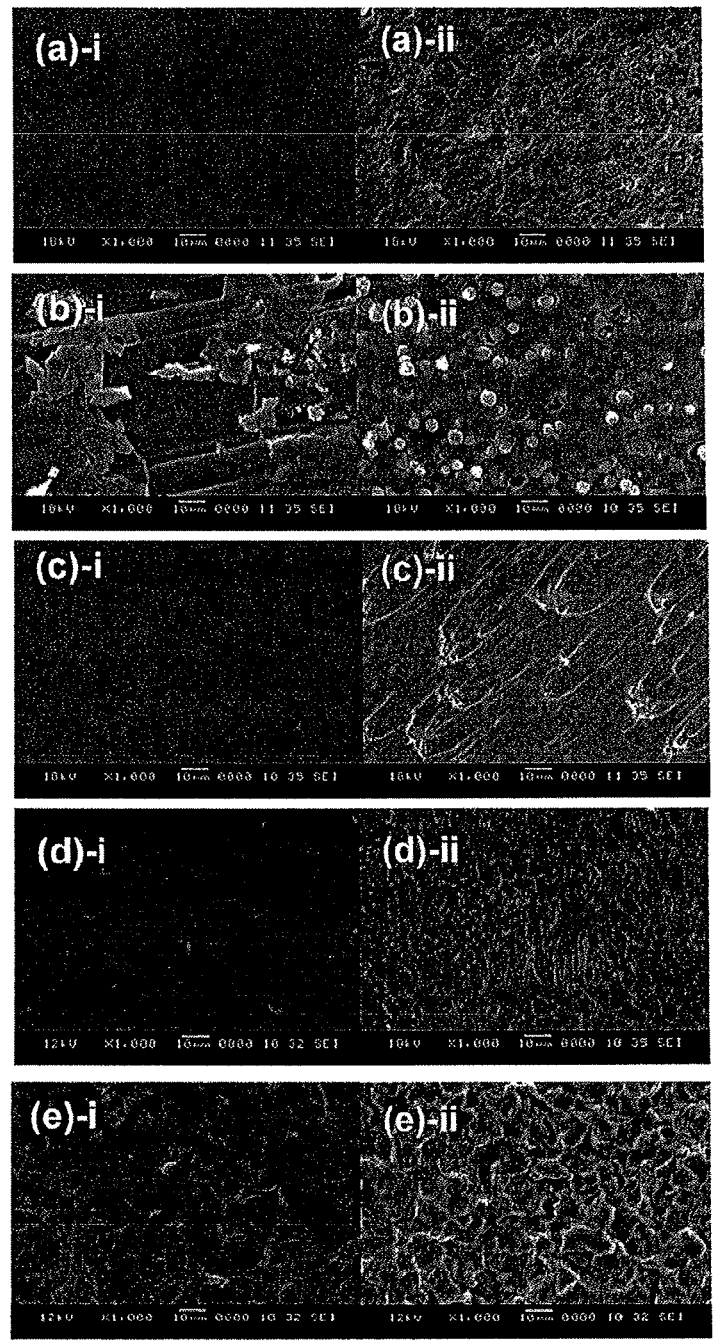

FIG. 12 are graphs of stress/strain curves before and after enzymatic degradation for (a) [PEG$_{10k}$]$_{50}$-[PCL$_{1k}$]$_{50}$; (b) [PEG$_{10k}$]$_{50}$-[PCL$_{1k}$]$_{50}$+20 wt % POSS; (c) [PEG$_{1k}$]$_{50}$-[PCL$_{1k}$]$_{30}$-[POSS]$_{20}$; (d) [PEG$_{10k}$]$_{50}$-[PCL$_{1k}$]$_{30}$-[POSS]$_{20}$ and (e) [PCL$_{40k}$]$_{100}$;

FIG. 13 are scanning electron microscope images for (a) [PEG$_{10k}$]$_{50}$-[PCL$_{1k}$]$_{50}$; (b) [PEG$_{10k}$]$_{50}$-[PCL$_{1k}$]$_{50}$+20 wt % POSS; (c) [PEG$_{1k}$]$_{50}$-[PCL$_{1k}$]$_{30}$-[POSS]$_{20}$; (d) [PEG$_{10k}$]$_{50}$-[PCL$_{1k}$]$_{30}$-[POSS]$_{20}$ and (e) [PCL$_{40k}$]$_{100}$.

Figure 14:
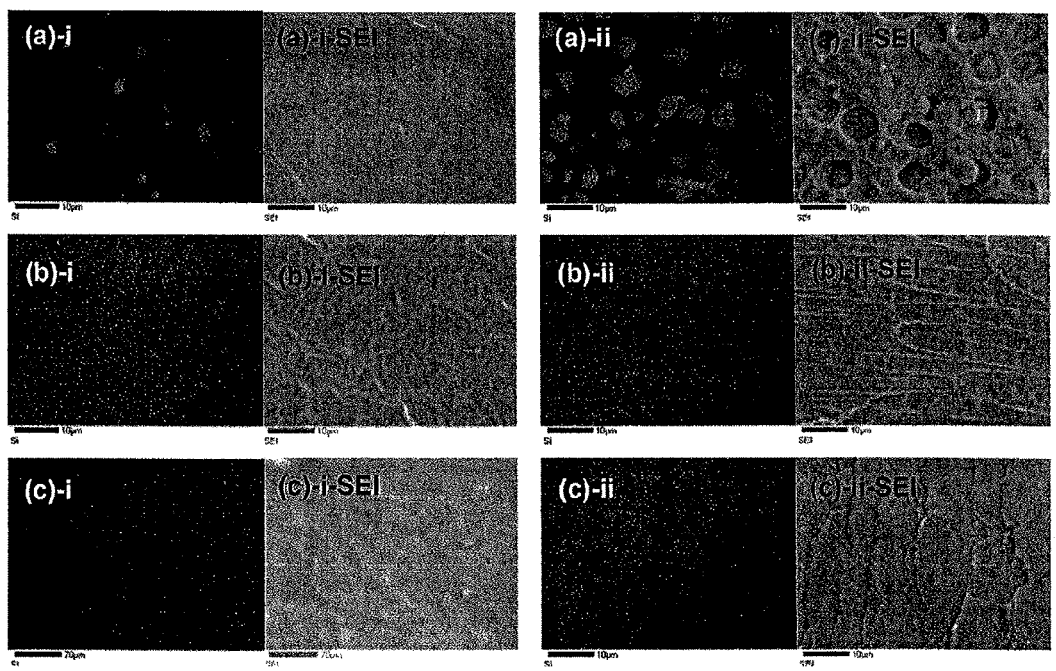
Figure 15:
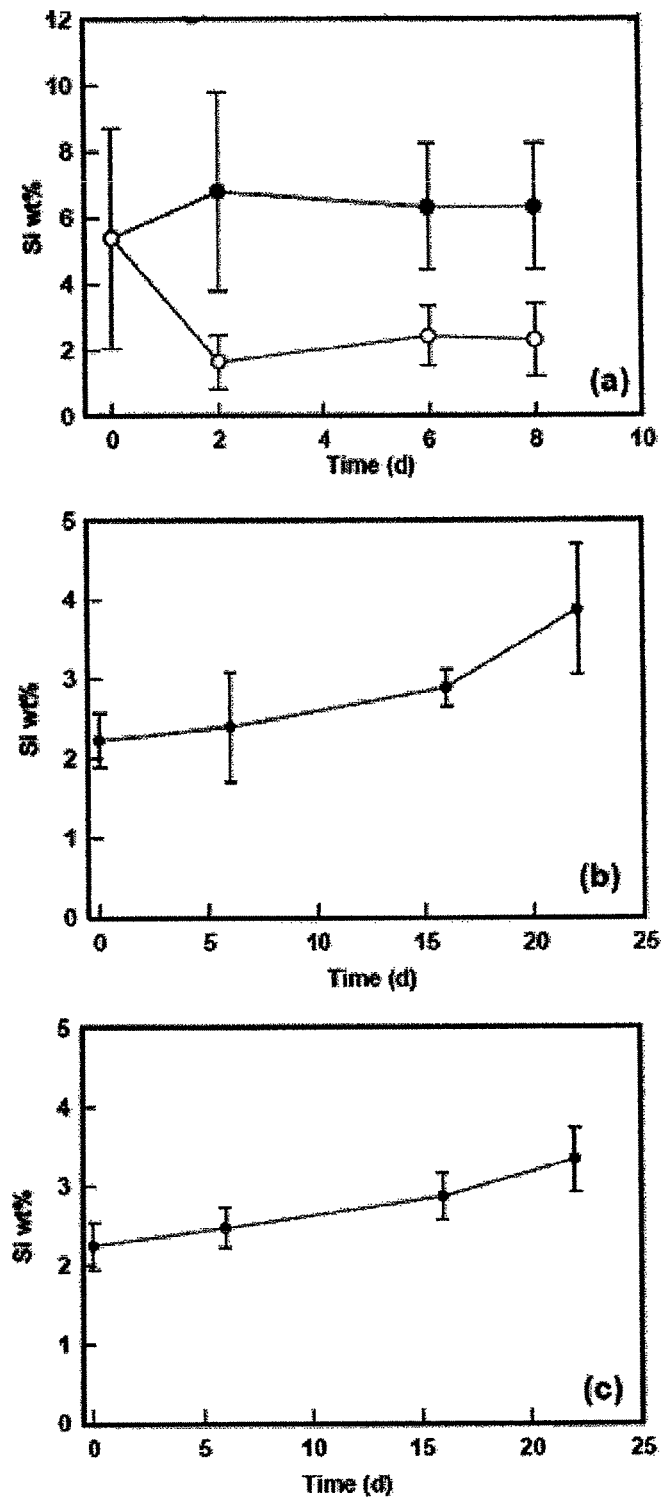
Figure 16:
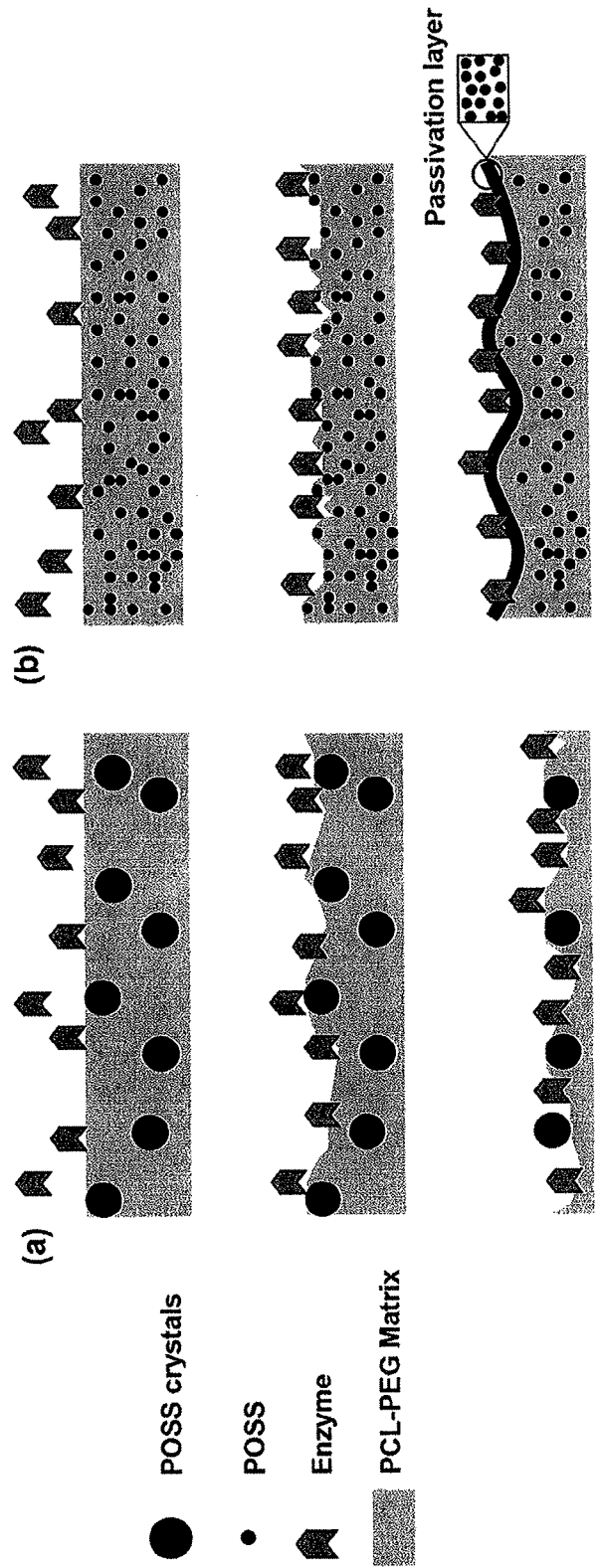
Figure 17:
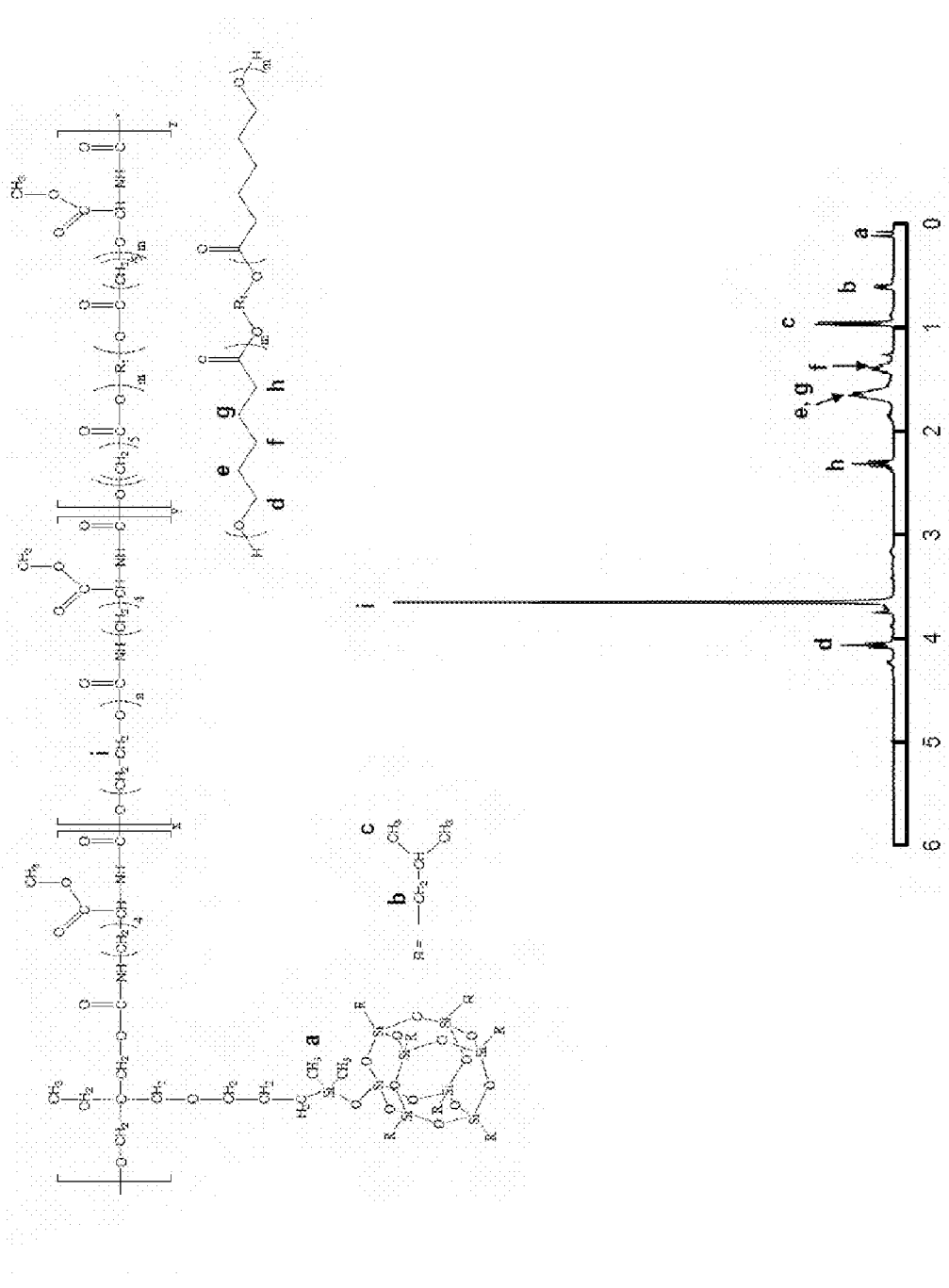
Figure 18:
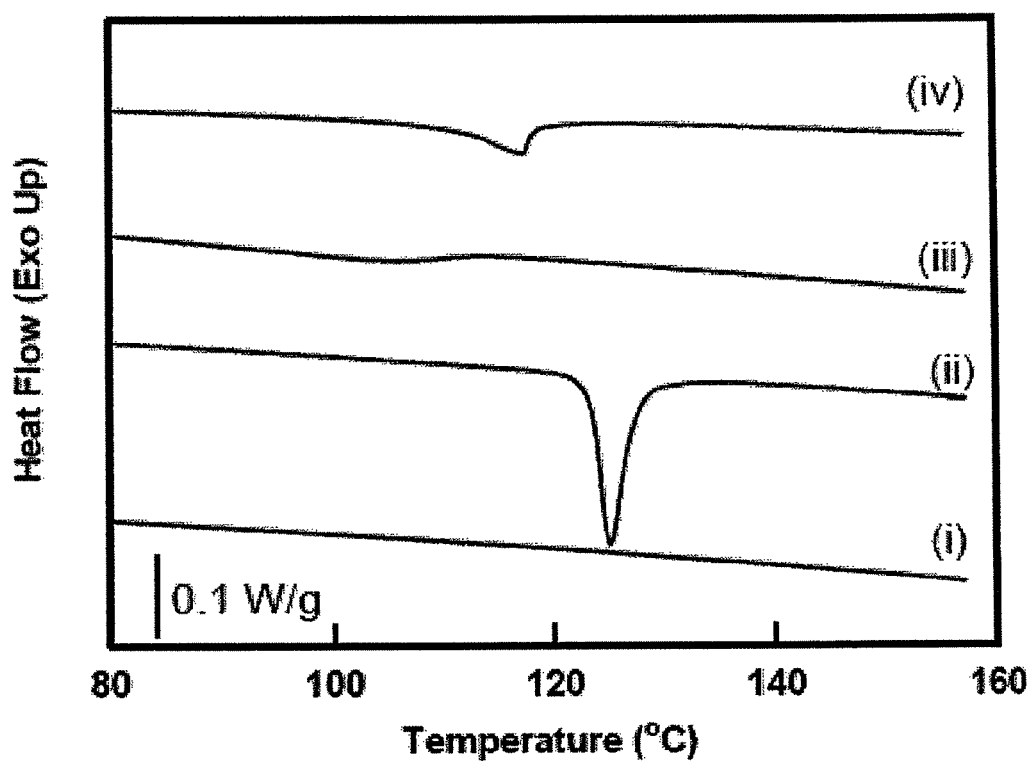
Figure 19:
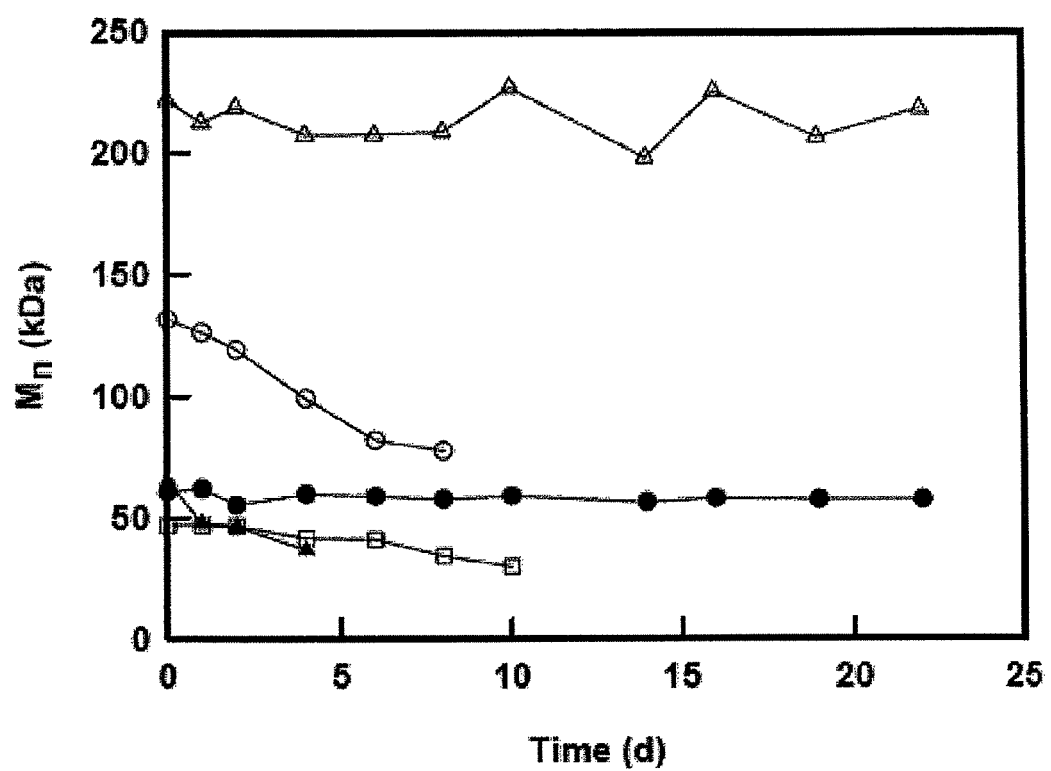

FIG. 14 are silicon maps obtained by wavelength dispersive x-ray spectroscopy for (a) [PEG$_{10k}$]$_{50}$-[PCL$_{1k}$]$_{50}$+20 wt % POSS; (b) [PEG$_{1k}$]$_{50}$-[PCL$_{1k}$]$_{30}$-[LP]$_{20}$; (C) [PEG$_{10k}$]$_{50}$-[PCL$_{1k}$]$_{30}$-[LP]$_{20}$ and (e) [PCL$_{40k}$]$_{100}$;

FIG. 15 is a graph of silicon concentration profiles during enzymatic degradation obtained by wavelength dispersive x-ray spectroscopy;

FIG. 16 is a model of a surface passivation mechanism for PCL-PEG based TPUs;

FIG. 17 is a graph of an NMR spectrum for a sample polymer [PEG$_{10k}$]$_{50}$-[PCL$_{1k}$]$_{30}$-[POSS]$_{20}$;

FIG. 18 is a graph of differential scanning calorimetry second heating traces for PCL-PEG based TPUs showing POSS melting peaks;

FIG. 19 is number-average molecular weight ($M_n$) remaining profiles of PCL-PEG based multiblock TPUs and [PCL$_{40k}$]$_{100}$ during enzymatic degradation;

FIG. 20 is thermal properties of PCL-PEG based multiblock TPUs and [PCL$_{40k}$]$_{100}$ before and after lipase incubation; and FIG. 21 is mechanical Properties of PCL-PEG based multiblock TPUs and [PCL$_{40k}$]$_{100}$ before and after lipase incubation.

DETAILED DESCRIPTION OF THE INVENTION

Figure 1:
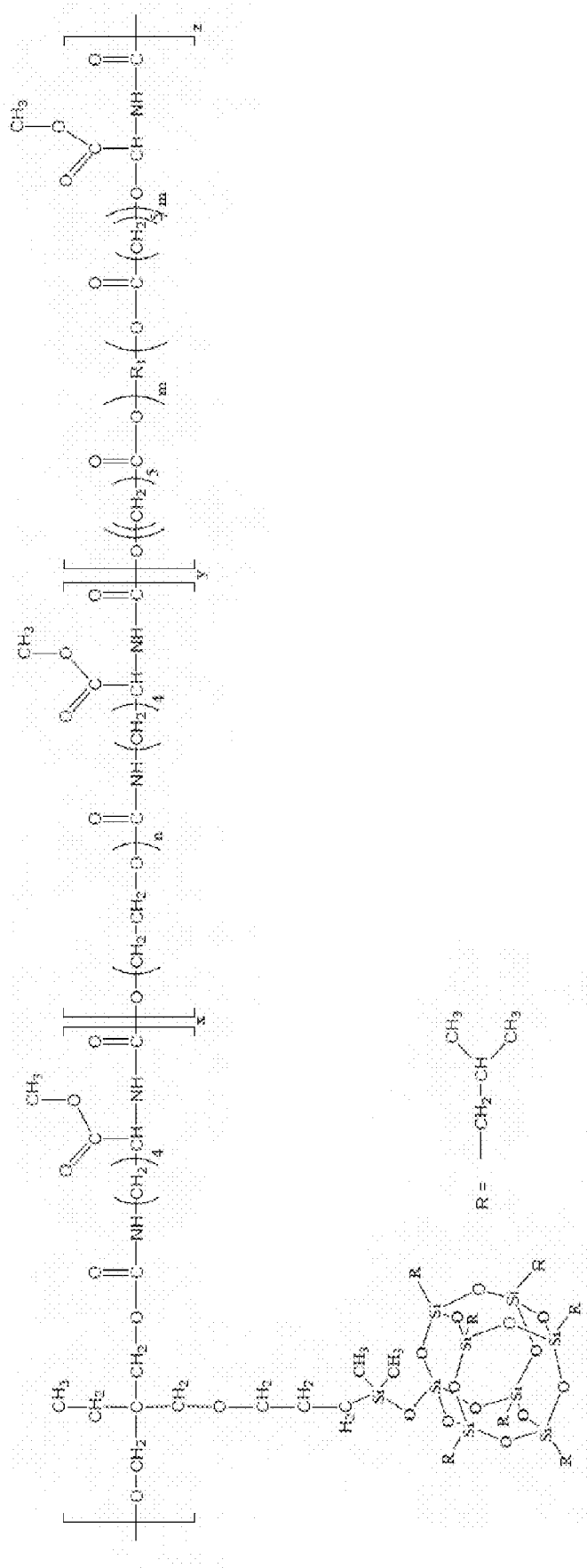
FIG. 1 is a schematic of a POSS polyurethane according to the present invention.
Figure 2:
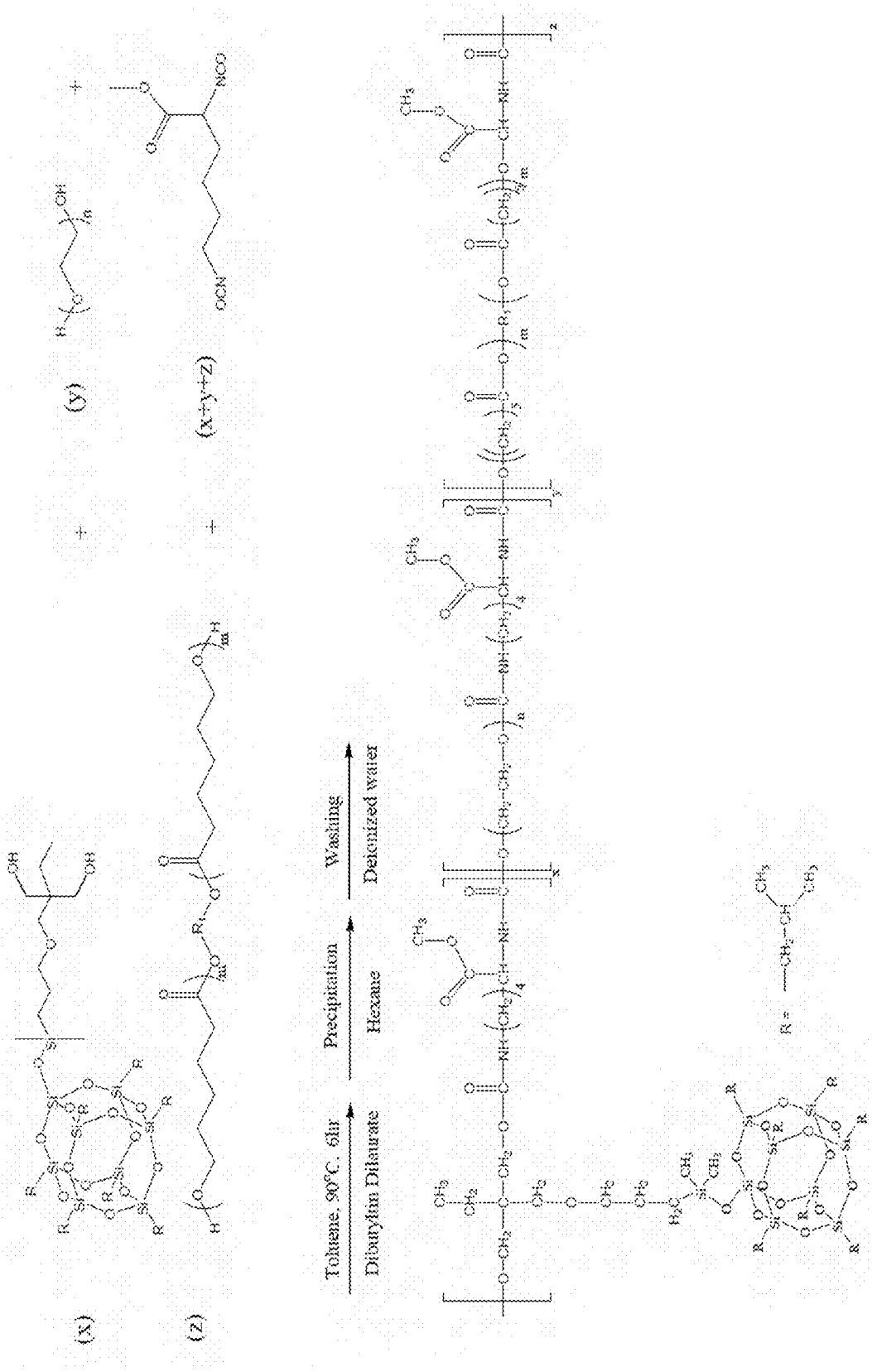
FIG. 2 is a schematic of the synthesis of POSS polyurethanes according to the present invention.

Referring now to the drawings, wherein like reference numerals refer to like parts throughout, the present invention involves a system incorporating polyhedral oligomeric silsesquioxane ("POSS") into conventional biodegradable thermoplastic polyurethanes to create biostable POSS polyurethanes, as seen in FIG. 1. Multi-block thermoplastic polyurethanes are synthesized from lysine-diisocyanate ("LDI") with poly(ε-caprolactone) ("PCL")-diol, POSS-diol, and poly(ethylene glycol) ("PEG") using a one-step technique, as seen in FIG. 2.

To discern the importance of POSS covalent incorporation on biostability, a physical blend of POSS and PCL-PEG multi-block TPUs and a pure PCL-PEG multi-block TPUs without POSS in it were prepared. Both differential scanning calorimetry ("DSC") and WAXD observations evidenced micro-phase separation due to thermodynamic incompatibility between hydrophilic PEG blocks and hydrophobic PCL-diol/POSS-diol. One-month enzymatic degradation experiments showed that POSS incorporation significantly suppressed in vitro degradation of PCL-based multi-block TPUs. The multiblock TPUs covalently tethered with 20 wt-% POSS moieties showed negligible mass loss and negligible molecular weight decrease within the experimental time range, while the physically blended one could slow down the degradation, but could not inhibit enzymatic hydrolysis. Calorimetric, spectroscopic, and mechanical and microscopic observations evidenced that all TPUs were surfaced eroded by enzyme attack, in which the chemical composition and the bulk mechanical properties of all TPUs exhibited little changes.

The biodegradation behavior of POSS-PCL-PEG TPUs was also characterized by proton nuclear magnetic resonance spectroscopy ($^1$H-NMR), tensile tests, and wavelength dispersive x-ray spectrometry ("WDS") after enduring 22-day accelerated enzymatic hydrolytic degradation tests. POSS incorporation significantly suppressed in vitro enzymatic hydrolytic degradation of PCL-PEG based multi-block TPUs by a surface passivation mechanism. The covalently bonded POSS moieties developed a relatively continuous robust POSS-layer after initial degradation, which prevented ester bonds of PCL from enzymatic attack, thereby inhibiting further degradation. These striking results provide a new strategy to fabricate the polyester-based biostable thermoplastic polyurethanes (TPUs) applicable for long-term surgical implants.

The number-average molecular weight and molecular weight distributions of the hybrid polyurethanes and pure commercial PCL are detailed in FIG. 3. The molecular weight of the yielded products varied in the range of 51.9 kg/mol to 217.4 kg/mol, and their corresponding molecular weight polydispersities varied from 1.08 to 1.22, which are relatively narrow for addition polymerization. $^1$H-NMR analysis was used to quantitatively determine the molar ratio of PEG/PCL/POSS by comparing the integration value of proton signal of POSS macromers at δ 0.12 ppm (—O—Si(CH$_3$)$_2$—CH$_2$—), and that of PEG at δ 3.65 ppm (—CH$_2$—CH$_2$—O—), and that of PCL at δ 2.32 ppm (—(C═O)—(CH$_2$)$_4$—CH$_2$—O—). Before comparison, all of the integration values were normalized to those for a single proton. For reactions in which POSS was included, the POSS/PCL/PEG feed ratio, as indicated by the final number in each polymer's naming scheme, was not always what was observed in the resulting product. In [PEG$_{10k}$]$_{50}$-[PCL$_{1k}$]$_{30}$-[POSS]$_{20}$, the lowered POSS and PCL inclusion is most likely a factor of higher reactivity of PEG 10k blocks compared to POSS and PCL$_{1k}$ blocks.

Thermal behavior of the TPUs and [PCL$_{40k}$]$_{100}$ are detailed in FIG. 4, and the second heating curves for all TPUs and diols are shown in FIG. 6. All TPUs showed very similar glass transition temperature ($T_g$) ranging from −48.1° C. to −49.9°

C. The melting peak of [PEG$_{10k}$]$_{50}$-[PCL$_{1k}$]$_{50}$ at 48.9° C. can be ascribed to PEG-rich domains, which is lower than the pure PEG10k (63.4° C.). The small melting peak at 25° C. is assigned to PCL domain, where PCL blocks are sufficiently long to crystallize and are also able to substantially hamper PEG crystallization. These results were in agreement with what has been obtained by other researchers for multiblock copolymers containing PEG and PCL. After being physically blended with 20 wt-% POSS-diol macromer by solution cast, [PEG$_{10k}$]$_{50}$-[PCL$_{1k}$]$_{50}$+20% POSS features a higher melting point at 123.1° C., which is very close to the pure POSS-diol T$_m$ at 122° C. This indicates that the POSS macromer is immiscible with the multi-block TPUs prepared from PCL-diol and PEG-diol building blocks. [PEG$_{1k}$]$_{50}$-[PCL$_{1k}$]$_{30}$-[POSS]$_{20}$, in which POSS was covalently bonded with PCL-PEG, shows only one exothermal peak at (107.0° C.), which indicates that both PEG (1 kg/mol) and PCL (1 kg/mol) blocks are amorphous in the multi-block copolymer. The melting point of POSS is much lower than pure POSS diol, which can be ascribed to some miscibility in this system due to similar molecular weight of these three segments. The melting enthalpy of POSS-diol is much lower in the two multi-block TPUs covalently incorporating POSS moieties, i.e. [PEG$_{10k}$]$_{50}$-[PCL$_{1k}$]$_{30}$-[POSS]$_{20}$ and [PEG$_{1k}$]$_{50}$-[PCL$_{1k}$]$_{30}$-[POSS]$_{20}$, than that in [PEG$_{10k}$]$_{50}$-[PCL$_{1k}$]$_{50}$+20% POSS. This observation can be tentatively attributed to the higher crystallinity of the POSS-rich domains in the physically blended sample.

Wide Angle X-ray Scattering was conducted to access the microstructures of the multi-block thermoplastic polyurethanes (TPUs) films. For pure POSS-diol monomer, there are three characteristic diffraction peaks shown in FIG. 6. They are centered at d-spacing of 11.1 Å)(2θ=7.9°), 8.3 Å (2θ=10.6°), and 4.8 Å (2θ=18.6°), which are pretty similar with previous observations. For pure PCL with M$_n$=42 kg/mol, we can observe two strong characteristic diffraction peaks centered at d-spacing of 4.0 Å (2θ=22.5°) and 3.6 Å (2θ=25.0°), both of which can be assigned to 110 and 200 reflection peaks of PCL orthorhombic unit cell. However, these two characteristic diffraction peaks become very weak in [PEG$_{10k}$]$_{50}$-[PCL$_{1k}$]$_{50}$, which incorporates low molecular weight PCL-diol (1 kg/mol) and high molecular weight PEG-diol (10 kg/mol). As shown in FIG. 6, there is only one weak observable diffraction peak ascribed to PCL crystalline domain centered at 4.0 Å, and two strong characteristic peaks entered at d-spacing of 4.5 Å (2θ=19.9°) and 3.7 Å (2θ=24.3°), both of which can be ascribed to 120 and 1$\bar{3}$2 reflection peaks of PEG monoclinic unit cell, respectively. Clearly, the hydrophilic segment of PEG and hydrophobic PCL can each form independent crystalline microstructures driven by micro-phase separation due to thermodynamic incompatibility, although the diffraction peak related to PCL crystalline domain is weak due to its low molecular weight of PCL-diol building block.

After physically blending with 20 wt-% POSS-diol macromer, the sample features the third strong characteristic peak centered at d-spacing of 10.7 Å (2θ=8.3°), as shown in FIG. 6. That further confirms that POSS macromer is immiscible with the multi-block TPUs prepared from PCL-diol and PEG-diol segments, and form individual POSS-rich crystalline domain. The d-spacing of the POSS-rich crystalline domain is smaller than that of pure POSS-diol macromer, i.e. 11.1 Å. Probably, there could be some change in crystal lattice through THF-solution cast. In-depth X-ray analysis pertaining to the change in crystal lattice is beyond the scope of this paper. Interestingly, the similar observation also takes place in the multi-block TPUs covalently incorporating POSS moieties, i.e. [PEG$_{10k}$]$_{50}$-[PCL$_{1k}$]$_{30}$-[POSS]$_{20}$ and [PEG$_{1k}$]$_{50}$-[PCL$_{1k}$]$_{30}$-[POSS]$_{20}$. The diffraction peak related to POSS crystalline domain is also centered at d-spacing of 10.7 Å in both [PEG$_{10k}$]$_{50}$-[PCL$_{1k}$]$_{30}$-[POSS]$_{20}$ and [PEG$_{1k}$]$_{50}$-[PCL$_{1k}$]$_{30}$-[POSS]$_{20}$, as shown in FIG. 6. However, the intensity of the diffraction peak is lower than that in the physically blended counterpart. That means the physically blended sample feature POSS-rich domains with higher crystallinity at the same loading level. Besides, [PEG$_{10k}$]$_{50}$-[PCL$_{1k}$]$_{30}$-[POSS]$_{20}$ indicates another two strong characteristic peaks ascribed to 120 and 132 reflection peaks of PEG monoclinic unit. By comparison, [PEG$_{1k}$]$_{50}$-[PCL$_{1k}$]$_{30}$-[POSS]$_{20}$ only shows another amorphous halo due to the low molecular weights of PEG (1 kg/mol) and PCL (1 kg/mol) building blocks.

Thus, WAXS observations evidence that hydrophilic PEG blocks and hydrophobic PCL blocks and POSS macromers can each form individual crystalline microstructures in the multi-block thermoplastic polyurethanes (TPUs) due to micro-phase separation driven by thermodynamic incompatibility. With the same loading of POSS moieties, the physically blended sample could feature the POSS-rich domain with higher crystallinity than the counterparts covalently incorporating POSS moieties.

In this PCL-PEG based TPU system, the hydrophilic PEG blocks were hydrated by water molecules, leading to mass gain and volumetric expansion. The swelling was prevented by the presence of hydrophobic PCL and/or POSS-rich domains. It was found that the water uptake of the TPUs increases with increasing PEG content, as shown in FIG. 4. Also, the water uptake has the dependence of the molecular weight of PEG-diol blocks. The water uptake of [PEG$_{1k}$]$_{50}$-[PCL$_{1k}$]$_{30}$-[POSS]$_{20}$ is 70.7%, significantly lower than the other TPUs we examined, the water uptake of which spanned from 164.4% to 182.0%. This is understood by the fact that the shorter PEG chain length in [PEG$_{1k}$]$_{50}$-[PCL$_{1k}$]$_{30}$-[POSS]$_{20}$ may lead to higher density and interconnectivity of the hydrophobic POSS domains, which serve as the physical crosslinks of the hydrogel in the water-swollen state, so as to suppress the swelling and water uptake of the hydrogel.

Representative stress-strain curves of all five samples are provided in FIG. 7, and the tensile properties are summarized in FIG. 8. All of them feature the typical extensional behavior of semi-crystalline polymers, except [PEG$_{1k}$]$_{50}$-[PCL$_{1k}$]$_{30}$-[POSS]$_{20}$, which has much lower crystallinity than the others. These polymers initially display steep linear slopes, culminating in a yield point at a strain of approximately 20%. Following this yield point, the materials can be stretched further with plastic-like deformation followed by strain-hardening to an extension of 1200%, the maximum extension limit of our instrument for sample with this specific dimension. In contrast, [PEG$_{1k}$]$_{50}$-[PCL$_{1k}$]$_{30}$[POSS]$_{20}$ displays characteristic elastomeric deformation, consistent with the observation that the soft segments are amorphous for this composition.

As displayed in FIG. 7, the yield point for necking of the [PEG$_{10k}$]$_{50}$-[PCL$_{1k}$]$_{50}$ was 4.6 MPa and 20% strain. This tensile yield for the TPU was followed by a period of elongation up to 670% strain at a relative constant stress of 4.4 MPa. As the material continued to undergo constant strain, an upturn in the stress after the 670% strain point was observed, indicating the onset of strain-hardening region that continued in the TPU. Compared with pure [PEG$_{10k}$]$_{50}$-[PCL$_{1k}$]$_{50}$, the physically blended samples, [PEG$_{10k}$]$_{50}$-[PCL$_{1k}$]$_{50}$+20% POSS, showed higher elastic modulus and yield stress. This is understood as the fact that as POSS inclusion can enhance the modulus and strengthen of the resulting nanocomposites. The Young's modulus and yield stress of $[PEG_{10k}]_{50}$-$[PCL_{1k}]_{30}$-$[POSS]_{20}$ is higher than the $[PEG_{10k}]_{50}$-$[PCL_{1k}]_{50}$+20% POSS, due to stronger chemical bonding among the three building blocks in the former material.

FIG. 9 exhibits the influence of POSS incorporation on enzymatic degradation of multi-block TPUs. Highly crystalline PCL films with the same thickness as our samples were reported to totally degrade in 4 days in the presence of Pseudomonas lipase, which is consistent with our result here. As compared with $[PCL_{40k}]_{100}$, PCL-PEG multiblock TPUs (50 wt-% hydrophilic PEG block) showed a lower enzymatic degradation rate. If 20 wt % POSS moieties were physically blended into the neat PCL-PEG multiblock TPUs, its enzymatic degradation time significantly increased from 7 d to 14 d. More surprisingly, except a very small portion of mass loss at initial stage, the two TPUs covalently incorporating POSS moieties, i.e. $[PEG_{10k}]_{50}$-$[PCL_{1k}]_{30}$-$[POSS]_{20}$ and $[PEG_{1k}]_{50}$-$[PCL_{1k}]_{30}$-$[POSS]_{20}$, showed nearly no mass loss within our experimental time range. Their enzymatic degradation behavior also seems independent of PEG molecular weight. The normalized number-average molecular weight ($M_n$) for $[PCL_{40k}]_{100}$, $[PEG_{10k}]_{50}$-$[PCL_{1k}]_{50}$ and $[PEG_{10k}]_{50}$-$[PCL_{1k}]_{50}$+20% POSS showed an obvious decrease during degradation (FIG. 4b). $M_n$ for $[PCL_{40k}]_{100}$ and $[PEG_{10k}]_{50}$-$[PCL_{1k}]_{50}$ lost 40% after 4 d and 8 d degradation, despite larger than 90% weight loss. This can be tentatively assigned to the surface erosion mechanism by enzyme. The decrease in the $M_n$ of these three polymers could be attributed to the small molecules remaining on the polymer surface after degradation. GPC test further showed molecular weight of the two TPUs covalently incorporated by POSS moieties kept almost constant within the experimental time scope.

Water uptakes of all the materials during degradation are shown in FIG. 9c. The three samples with significant mass loss exhibited increasing water uptake during lipase incubation, which may be ascribed to increase of hydrophilic groups such as carboxyl and hydroxyl groups on the surface. The two TPUs with covalently-incorporated POSS showed no change in water uptake in 22 days.

$^1$H NMR was used to detect the changes in the chemical composition of four TPUs during the degradation by calculating the ratio of the peak areas assigned to PEG and PCL blocks in the spectrum. The results are shown in FIG. 10. It is found that EG/CL of all TPUs did not exhibit significant changes during lipase incubation, whether the materials showed mass loss or not. This observation can be ascribed to the fact that PCL can be degraded by lipase, and the remaining PEG and PEG-rich segment at the surface are water soluble, easily escaping from the surface and dissolving in the degradation medium. Together, these combined to yield relative stability of the chemical compositions of the multi-block copolymers during degradation.

The phase behavior and thermal transitions of samples after enzyme incubation were investigated by DSC. As-cast films were put into PBS buffer for one day as control (referred to as swelled/dried films). The heat flow traces shown here are from first heating runs. FIG. 6 shows the first heating curves of $[PCL40k]_{100}$ and multiblock TPUs before and after enzyme incubation. FIG. 20 summarizes their thermal property changes. It is found that $T_g$, $T_m$ and $\Delta H_m$ for all the segments did not change a lot after enzyme incubation. The main melting peaks which are around 50° C. in all the four samples with higher crystallinity become more intense after lipase incubation, which could be attributed to the subsequent crystallization of amorphous areas and crystallite defects.

Representative stress-strain curves for all materials before and after enzyme incubation were shown in FIG. 12, and the tensile properties are summarized in FIG. 21. For degraded samples, i.e. $[PEG10k]_{50}$-$[PCL1k]_{50}$, $[PEG10k]_{50}$-$[PCL1k]_{50}$+20 wt % POSS, and $[PCL40k]_{100}$, specific degradation times were picked. Samples after that time point broke into small pieces, and tensile testing for which was beyond our capability. It was observed that the bulk mechanical properties for all materials did not deteriorate, but increased a little bit after the enzymatic degradation test, resulting from the subsequent crystallization mentioned above. As the degradation progressed, the thickness of the three degraded samples decreased, resulting in noisy stress-strain curves.

The surface morphology of the enzymatically degraded polyurethanes was investigated by SEM analysis and was compared with the TPUs films soaked in PBS for 1 day and dried, as shown in FIG. 13. Compared to "post-wet" (after swelling in water and drying) controls, all TPUs and $[PCL40k]_{100}$ exhibited uniform rough surface in the presence of lipase, indicating that all TPUs were eroded by a surface-limited mechanism when exposed to lipase, typical of enzymatic attack. In the case of $[PEG10k]_{50}$-$[PCL1k]_{50}$+20 wt % POSS, there are some fragments on the surface of post-wet samples (FIG. 13b-i). The possible reason is that the material was softened during incubation and showed restructuring during drying, and the weak bonding between POSS and the bulk TPUs make the surface disintegrated. After being incubated in enzyme for 10 days, this physical blend system showed porous structures on the surface, with the diameters of particles being 5-10 μm (FIG. 12b-ii). In contrast, we did not find this morphology in covalent-bonding systems (FIGS. 13c-ii and 13d-ii). Previously it was mentioned that the chemical composition and bulk mechanical properties of all degraded materials remained almost constant during enzyme incubation, which is in agreement with a surface erosion mechanism shown by SEM here.

The surfaces of the two TPUs covalently bonded with POSS were also eroded, which is consistent with their initial mass loss profiles. The surface of $[PEG1k]_{50}$-$[PCL1k]_{30}$-$[POSS]_{20}$ looks smoother than that of $[PEG10k]_{50}$-$[PCL1k]_{30}$-$[POSS]_{20}$, as a result of lipase exposure (FIGS. 13c-ii, 13d-ii). The difference in surface topography is supposed to result from differences in crystallinity. $[PEG1k]_{50}$-$[PCL1k]_{30}$-$[POSS]_{20}$, the one with lower crystallinity, was relatively soft compared to its counterpart, so the roughed surface resulting from enzyme attack got easily restructured during drying process, leading to a smoother surface.

Finally, Wavelength Dispersive X-Ray Spectrometry ("WDS") was employed to investigate the distribution of POSS on the surface of the material of both physically blended system and covalently bonded systems. For the silicon maps shown in FIG. 14, the gray scale represents the Si concentration on the surface, i.e. the brighter part on the images means higher silicon concentration on the surface. FIG. 14a-i shows that POSS aggregated into micron size domains in $[PEG10k]_{50}$-$[PCL1k]_{50}$+20% POSS. When this polymer film was exposed in the lipase solution, more POSS aggregates exhibited on the surface (FIG. 14a-ii). The brighter part, which is believed to be the POSS aggregates, corresponds to the particles observed in the corresponding SEM images (FIG. 14a-ii-SEI). At the same POSS loading, the two TPUs covalently bonded with POSS exhibit uniform dispersed POSS domains before and after enzyme incubation (FIGS. 13b-i, ii and c-i, ii).

For each sample, ten different locations were scanned by WDS, and the percentage of silicon element was calculated. Average values for these ten locations are reported herein, with the error bars indicating the standard deviation, as shown in FIG. 15. As mentioned above, after enzymatic degradation, [PEG10k]$_{50}$-[PCL1k]$_{50}$+20% POSS exhibited particle/matrix morphology. So here particle and matrix were detected respectively. It was found that silicon concentration is significantly higher in the particles than in the matrix (FIG. 15a), which corresponds to the silicon concentration map of this material. The silicon concentration of either the particles or the matrix remained almost constant from day 2 to day 8. For the other two covalently bonding system, [PEG1k]$_{50}$-[PCL1k]$_{30}$-[POSS]$_{20}$ and [PEG10k]$_{50}$-[PCL1k]$_{30}$-[POSS]$_{20}$, (FIGS. 15b and 15c), silicon concentration increased slightly from 2.2 to 3.9 wt % and from 2.2 to 3.3 wt % respectively, as the incubation day increases. Converting the silicon weight percentage to POSS weight percentage, the POSS concentration on the surface of these two materials before degradation are 10.3 wt %, which is much lower than the results obtained by $^1$H NMR, which are 21 wt % and 15 wt % respectively. Probably, during solvent evaporation in solution cast process, more POSS was embedded inside the film than on the surface, the reason of which needs our further investigation.

Combining SEM and WDS observations, we propose a surface passivation mechanism for different degradation behaviors of both physically blended system and covalently bonding system with POSS in enzyme incubation. In the physically blended system (FIG. 16a), when this polymer film was exposed to enzyme, PCL-PEG part was eroded after enzyme degradation, leading to more POSS domains exhibiting on the surface and the resulting large correlation distance between POSS-POSS domains can not inhibit enzymatic hydrolysis, although they can slow down the degradation to some degree. In the covalently bonded system, as the PCL-PEG part was eroded, nano-dispersed POSS remained and the significantly narrowed the space between POSS-POSS domains formed a relative continuous layer to effectively prevent enzyme from attacking the ester bond of the PCL segment, making the sample resistant to enzymatic hydrolysis degradation (FIG. 16b).

EXAMPLES

Multi-block thermoplastic polyurethanes were synthesized from PCL-diol, PEG, 2,2,4-trimethyl-1,3-pentane (TMP) POSS diol (R-group=$^i$Bu) (hereafter "POSS diol") (95%, Hybrid Plastics, Inc.®), and lysine methyl-ester diisocyanate (LDI), using a one-step technique, as shown in FIG. 2. First, PEG (1 k and 10 kg/mol, Fluka®, Inc.) was purified by preparing a THF solution, precipitated into n-hexane several times, and then filtered. These steps were repeated several times. The purified powder was then dried in a vacuum oven at room temperature overnight. LDI (Kyowa Hakko Chemical Co., Ltd.) was purified by vacuum distillation at an oil bath temperature of 180° C. PCL-diol (1.25 kg/mol, Sigma-Aldrich®, Inc.) and POSS diol were used without further purification. In a 100 ml three-neck flask, POSS-diol, PCL diol and PEG were dissolved in toluene (Fisher®, ACS Certified), which had been dried with the aid of calcium hydride (CaH$_2$, Aldrich). Under the protection of a nitrogen purge, the flask was heated to 50° C., and a stoichiometric amount of LDI (ρ=1.157 g/mL) was added into the 10 wt-% toluene solution. The reaction mixture was further heated to 90° C. and several drops of dibutyltin dilaurate catalyst (Sigma-Aldrich) were added through a syringe. The reaction was kept at 90° C. for ca. 6 h under the nitrogen purge and a distinctive viscosity rise was observed. The polymer solution was then precipitated into an excess of n-hexane, and washed with de-ionized water several times in order to remove any unreacted PEG. PCL (42 kg/mol, Aldrich) was purchased and used as a control without further processing.

The nomenclature used in this application to designate this family of multi-block thermoplastic polyurethanes (TPUs) denotes the molecular weight of the PEG and PCL chains, and the subscripts are the feed weight percent for each segment. Therefore, [PEG1k]$_{50}$-[PCL1k]$_{30}$-[POSS]$_{20}$, for example, designates a multi-block copolymer consisting of PEG1k, PCL1k and POSS blocks. Their feed weight percent is 50:30:20. Since POSS molecular weight remains same for all the polymers, it is not designated in this application.

The yielded POSS TPUs were cast from THF solution as following: the polymer (1.5 g) was dissolved in THF (10 mL), and poured into a PTFE casting dish with a diameter of 10.5 cm, then transferred to a chamber to allow for a slow solvent evaporation. Following 48 h evaporation at room atmosphere, the films (still in the dish) were put in a vacuum at room temperature for 3~4 days to remove any residual solvent. The yielded clear, flexible films are 0.2 mm in thickness, as determined by a digital caliper. The physically blended sample, [PEG10k]$_{50}$-[PCL1k]$_{50}$+20% POSS, was made by mixing [PEG10k]$_{50}$-[PCL1k]$_{50}$ with POSS and the weight percentage of POSS is 20%.

In vitro enzymatic degradation experiments were carried out at 37° C. in pH 7.0 PBS buffer containing 0.05% Tween-20 and 0.4 mg/ml lipase. Samples with dimensions of 15 (length)×5 (width)×0.2 mm (thickness) were cut from one cast films. Sodium azide was added to the buffer in order to prevent microorganism growth. Each sample was placed into an individual vial (20 mL) containing 5 mL buffer solution. The buffer was changed every other day to maintain enzyme activity. At predetermined degradation time points, three samples were taken out each time from the buffer, washed with de-ionized water, patted dry, and weighed. After drying under vacuum at room temperature for 3-4 days, samples were reweighed to determine total percentage of mass loss. Mass percent remaining and water uptake were calculated using the following equations:

$$\text{Mass Remaining} (\%) = \left(\frac{m_d}{m_{orig}}\right) \cdot 100 \quad (1)$$

$$\text{Water Uptake} (\%) = \left(\frac{m_w - m_d}{m_d}\right) \cdot 100 \quad (2)$$

where $m_d$ is the sample after drying under vacuum, $m_{orig}$ is the mass of the initial, non-degraded sample, and $m_w$ is the mass of the wet sample. Average values for three samples are reported herein, with the error bars indicating the standard deviation. All the samples were vacuum dried for one week before being subjected to further analysis.

Gel permeation chromatography (GPC) was conducted using Waters® Isocratic HPLC System equipped with a temperature controlled differential refractometer (Waters 2414). Multi-angle laser light scattering was employed (Wyatt miniDAWN) using three angles (45°, 90°, 135°) for absolute molecular weight determination. Samples were dissolved in THF at a concentration of approximately 2 mg/mL, and were passed through a 0.2 μm PTFE filter prior to injection. The GPC was operated at a flow rate of 1 mL/min.

Chemical compositions of the final products were determined by liquid phase proton nuclear magnetic resonance spectroscopy ($^1$H-NMR) using methods described known in the art. Samples were dissolved in d-chloroform (CDCl$_3$), and were analyzed by performing 24 scans per sample using a 300 MHz Bruker® spectrometer.

Phase behavior and thermal transitions of TPUs were determined by differential scanning calorimetry (DSC, TA Instruments® Q200) under continuous nitrogen purge (50 mL/min). The samples were made by encapsulating approximately 3 to 5 mg of polymer in a TA aluminum pan. The heating and cooling rate for each sample was 10° C./min. After annealing each sample at 160° C. for 5 min to melt residual POSS crystals, the samples were cooled to −85° C., and then heated up to 160° C. The data reported here are from second heating runs. Glass transition temperatures ($T_g$) were taken as the midpoint of the stepwise decrease of the heat flow trace observed during heating. Melting points were taken as the temperatures corresponding to the valley of the endothermic transition during the second heat, with heats-of-fusion (ΔH) being determined through integration of that peak and normalization for the sample mass.

In order to access the microstructures of the thermoplastic polyurethanes films, wide angle X-ray scattering ("WAXS") was conducted by Rigaku® S-MAX 3000, small angle X-ray scattering ("SAXS") coupled with a fully integrated 2-dimensional multi-wire proportional counter, and simultaneous wide angle X-ray scattering capabilities, which includes a FujiFilm® FLA7000 reader and a Fujifilm IP Eraser 3 to collect the scattered X-rays. Here, the X-ray source was Cu $K_\alpha$ radiation with wavelength, λ=1.5405 Å, obtained from Rigaku rotating anode operated at 45 kV and 0.88 A. The distance between sample and FujiFilm is fixed at 120 mm for wide angle x-ray scattering collection. The resulting scattering angular is in range of $5°<2\theta<40°$. The WAXS profiles of the sample were collected without subtraction of the background determined by running the empty sample chamber since the whole X-ray system was run at high vacuum condition.

The water swelling behavior of the TPUs was studied by a gravimetric procedure. The dried Samples were cut into rectangular pieces with 10 mg around and immersed in Millipore® water for 12 hours to equilibrate the water uptake. Then, the samples were removed from the water, patted dry, and weighed again. Water uptake measurements were quantified using equation (2). All reported values represent the average of two samples.

The mechanical properties were evaluated by uniaxial tensile testing employing Linkam TST 350 (Linkam Scientific Instruments; 20 N load cell, 0.01 N resolution) tensile testing system at room temperature. The polymer films were punched into a dogbone geometry using dogbone die (TestResources, Inc; machined tool steel), a press (Carver Inc, model C), and minimal pressure. The dimensions of the dogbone die were determined from a scaled down D638-03 Type IV ASTM standard and had a width of 1.5 mm, straight length of 8.25 mm, and total length of 28.75 mm. Samples were extensionally deformed at crosshead speed of 200 μm/s. This experiment was conducted three times per material. Young's modulus was calculated by finding the initial slope of the stress versus strain curve ($0<\epsilon<8\%$) using linear regression. The yield stress was determined by the maximum stress following the proportional limit, and the strain-at-break recorded as the strain at the point where the force became zero (after elongation).

Mechanical properties of the materials after degradation were tentatively determined using dynamic mechanical analysis (Q800, TA Instruments) in tensile testing mode with a displacement rate of 1.0 mm/min. Samples were cut from both the as-cast films and the degraded films with the typical dimensions of 9 mm (length)×1.5 mm (width)×0.2 mm (thickness). Each experiment was repeated three times.

The surface morphologies of all the films before and after enzymatic degradation were investigated using scanning electron microscopy ("SEM") (JEOL®, JSM-5600). All the samples were coated with gold for 60 s using an Enton® Vacuum-Desk II gold sputter-coater to yield coating thickness of approximately 200 Å, suitable for SEM observation without charge accumulation.

The JEOL 8600 Electron Microprobe is equipped with five Wavelength Dispersive X-Ray Spectrometers and was used to quantitatively analyze the elements on the sample surfaces. The JEOL 8600 is equipped with the Geller Microanalytical Hardware/Software automation package. Film was coated with gold using the same methods as described for SEM samples. High resolution element maps for Silicon were generated for each sample to show the relative silicon concentration within one sample. Acquisition time for each map was one hour. Brighter fields represent higher silicon concentration. For each sample, ten different locations were scanned, and the concentration of silicon was calculated. The accelerating voltage, the filament current, and the probe current are 10 kV, 240 mA, and 5.4 nA, respectively, which were kept constant during the whole experiment. The fixed working distance between the sample and pole piece of the JEOL 8600 is 11 mm.

The present invention involves the development of new robust polyurethanes based on poly(ϵ-caprolactone) and polyhedral oligomeric silsesquioxane. The invention significantly overcomes the enzymatic instability of PCL-based polyurethanes, which is typically the main reason for their failure when used for long-term biomedical implants and application. The invention also offers several major advantages and features when compared to existing technologies, including but not limited to: (i) significantly prolonging enzymatic biostability as verified by in vitro experiments; (ii) the biocompatible building blocks render the yielded polyurethanes feasible for numerous biomedical applications; (iii) the tunable chemical structures render facile tailoring of their physical properties (from the plastics-like to the rubber-like); and (iv) the tunable mechanical properties (i.e., modulus, strength, and toughness, among others) render PCL-based POSS TPUs as a potential source for both soft tissue replacement and implants (i.e. vascular grafts and catheters, among many others), and hard tissue regeneration.

Accordingly, commercial potential exists for the anticipated biostable properties of the same invention. For example, the TPUs have numerous commercial applications, including but not limited to: (i) long-term surgical implants; (ii) blood-contacting medical devices including catheters, stents, and vascular grafts; (iii) electrical insulation for implanted electrical components, such as pacemaker leads; and (iv) patch materials for gastrointestinal surgery, coronary surgery, and urological surgery, among many others.

Although the present invention has been described in connection with a preferred embodiment, it should be understood that modifications, alterations, and additions can be made to the invention without departing from the scope of the invention as defined by the claims.

What is claimed is:

1. A multiblock thermoplastic polyurethane, comprising:
 a soft block including polyethylene glycol and poly(ϵ-caprolactone); and
 a hard block including a diisocyanate and a polyhedral oligosilsesquioxane covalently tethered to said diisocyanate;
 wherein the polyurethane comprises at least fifty percent polyethylene glycol; and
 wherein the polyurethane has the formula $[PEG_{10k}\text{-}DI]_{50}$-$[PCL_{1k}\text{-}DI]_{30}$-$[POSS\text{-}DI]_{20}$, where $PEG_{10k}$ is polyethylene glycol with a molar mass of 10000, $PCL_{1k}$ is poly(ϵ-caprolactone) with a molar mass of 1000, DI is a diisocyanate, and POSS is polyhedral oligomeric silsesquioxane.

2. The polyurethane of claim 1, wherein said diisocyanate comprises lysine diisocyanate.

3. The polyurethane of claim 1, wherein said polyhedral oligosilsesquioxane comprises 2,2,4-trimethyl-1,3-pentane polyhedral oligosilsesquioxane.

4. The polyurethane of claim 3, wherein said multiblock thermoplastic polyurethane has the scheme:

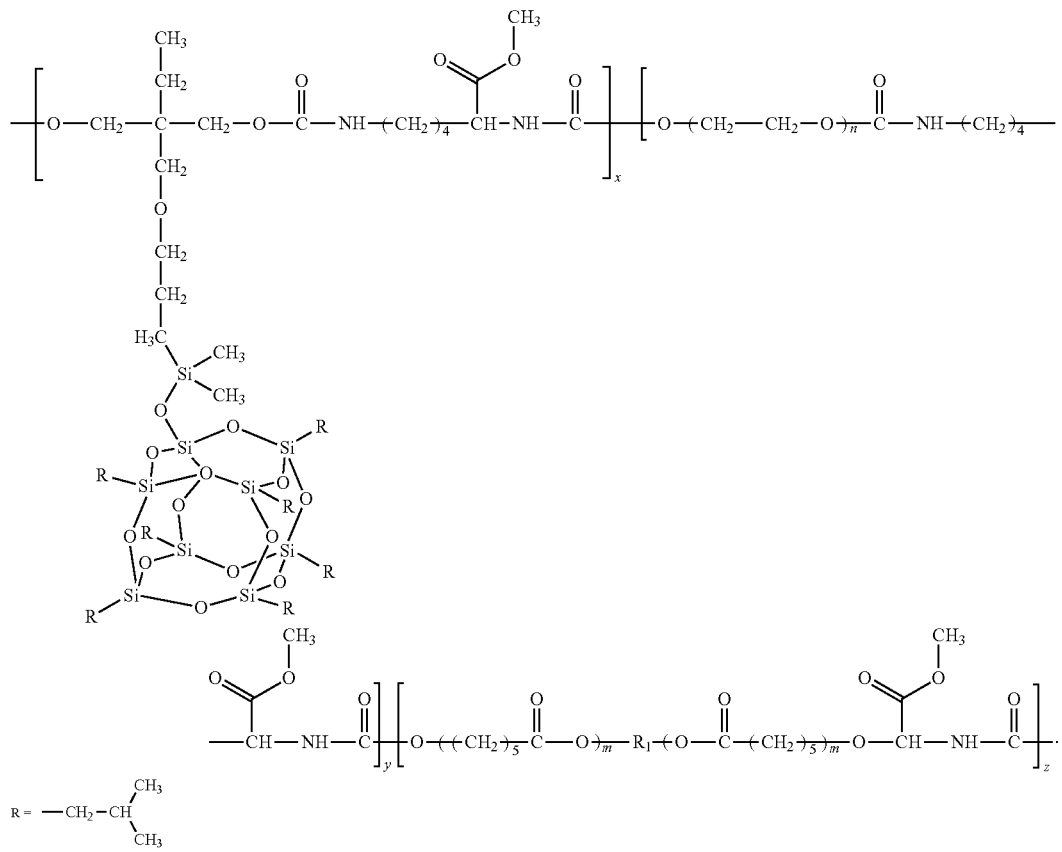

5. A multiblock thermoplastic polyurethane, comprising:
   a soft block including polyethylene glycol and poly(ε-caprolactone); and
   a hard block including a diisocyanate and a polyhedral oligosilsesquioxane covalently tethered to said diisocyanate;
   wherein the polyurethane comprises at least fifty percent polyethylene glycol; and
   wherein said polyurethane has the formula $[PEG_{1k}\text{-}DI]_{50}\text{-}[PCL_{1k}\text{-}DI]_{30}\text{-}[POSS\text{-}DI]_{20}$, where $PEG_{1k}$ is polyethylene glycol with molar mass of 1000, $PCL_{1k}$ is poly(ε-caprolactone) with a molar mass of 1000, DI is a diisocyanate, and POSS is polyhedral oligomeric silsesquioxane.

6. A method of forming a multiblock thermoplastic polyurethane, comprising the steps of:
   dissolving poly(ε-caprolactone), polyethylene glycol, and a polyhedral oligosilsesquioxane diol in a solvent;
   performing a nitrogen purge;
   heating the dissolved poly(ε-caprolactone), polyethylene glycol and polyhedral oligosilsesquioxane;
   adding a diisocyanate; and
   adding a catalyst;
   wherein the polyurethane comprises at least fifty percent polyethylene glycol; and
   wherein said biostable polymer has the formula $[PEG_{10k}\text{-}DI]_{50}\text{-}[PCL_{1k}\text{-}DI]_{30}\text{-}[POSS\text{-}DI]_{20}$, where $PEG_{10k}$ is polyethylene glycol with a molar mass of 10000, of $PCL_{1k}$ is poly(ε-caprolactone) with a molar mass of 1000, DI is a diisocyanate, and POSS is polyhedral oligomeric silsesquioxane.

7. The method of claim 6, wherein said diisocyanate comprises lysine diisocyanate.

8. The method of claim 7, wherein the catalyst is dibutyltin dilaurate.

9. The method of claim 8, wherein the step of heating the dissolved poly(ε-caprolactone), polyethylene glycol, and polyhedral oligosilsesquioxane comprises heating to about 50 degrees Celsius under a nitrogen purge.

10. The method of claim 6, further comprising the step of heating the dissolved poly(ε-caprolactone), polyethylene glycol and polyhedral oligosilsesquioxane and diisocyanate to 90 degrees Celsius after the step of adding said diisocyanate.

11. The method of claim 10, further comprising the step of precipitating said multiblock thermoplastic polyurethane.

12. The method of claim 11, wherein the step of precipitating said multiblock thermoplastic polyurethane comprises precipitating said polyurethane into an excess of n-hexane.

13. The method of claim 6, wherein said multiblock thermoplastic polyurethane has the scheme:

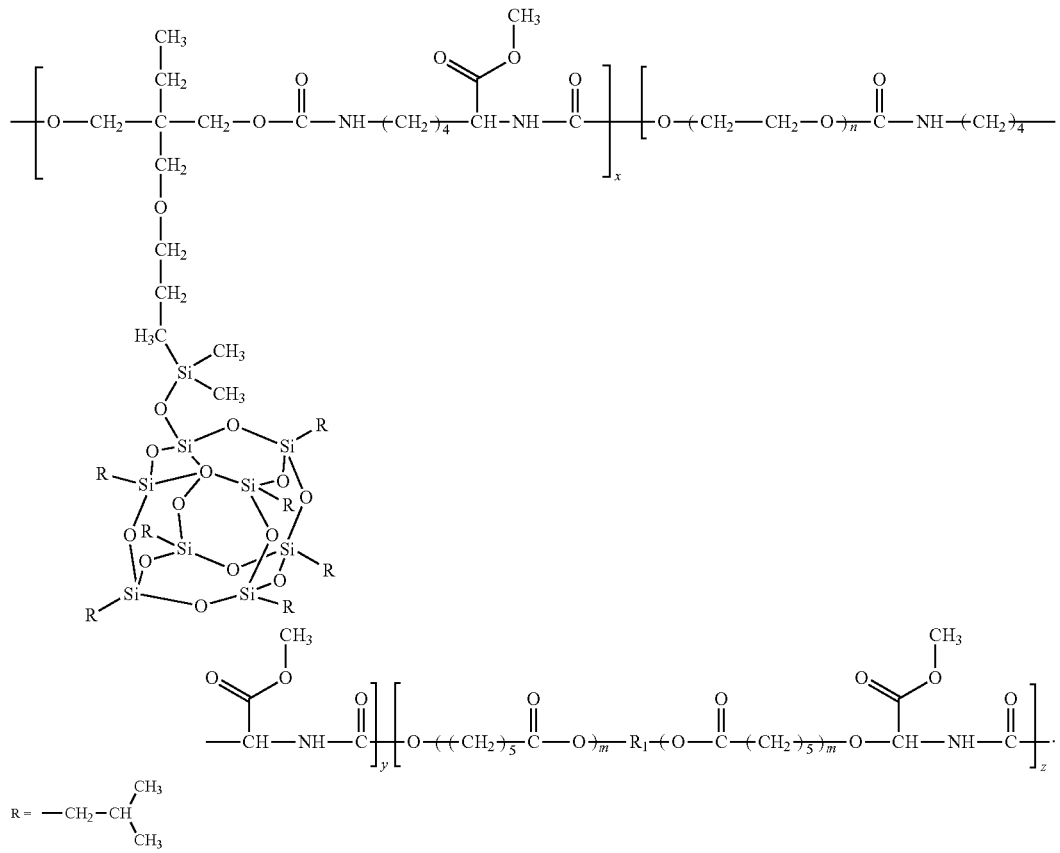

14. A method of forming a multiblock thermoplastic polyurethane, comprising the steps of:
dissolving poly(ε-caprolactone), polyethylene glycol, and a polyhedral oligosilsesquioxane diol in a solvent;
performing a nitrogen purge;
heating the dissolved poly(ε-caprolactone), polyethylene glycol and polyhedral oligosilsesquioxane;
adding a diisocyanate; and
adding a catalyst;
wherein the polyurethane comprises at least fifty percent polyethylene glycol; and
wherein said biostable polymer has the formula [$PEG_{1k}$-$DI$]$_{50}$-[$PCL_{1k}$-$DI$]$_{30}$-[$POSS$-$DI$]$_{20}$, where $PEG_{1k}$ polyethylene glycol with a molar mass of 1000, $PCL_{1k}$ is poly(ε-caprolactone) with a molar mass of 1000, DI is a diisocyanate, and POSS is polyhedral oligomeric silsesquioxane.

15. The polyurethane of claim 5, wherein said diisocyanate comprises lysine diisocyanate.

16. The polyurethane of claim 15, wherein said polyhedral oligosilsesquioxane comprises 2,2,4-trimethyl-1,3-pentane polyhedral oligosilsesquioxane.

17. The method of claim 14, wherein said diisocyanate comprises lysine diisocyanate.

18. The method of claim 17, wherein the catalyst is dibutyltin dilaurate.

19. The method of claim 18, wherein the step of heating the dissolved poly(ε-caprolactone), polyethylene glycol, and polyhedral oligosilsesquioxane comprises heating to about 50 degrees Celsius under a nitrogen purge.

20. The method of claim 19, further comprising the step of heating the dissolved poly(ε-caprolactone), polyethylene glycol and polyhedral oligosilsesquioxane and diisocyanate to 90 degrees Celsius after the step of adding said diisocyanate.

21. The method of claim 20, further comprising the step of precipitating said multiblock thermoplastic polyurethane.

22. The method of claim 21, wherein the step of precipitating said multiblock thermoplastic polyurethane comprises precipitating said polyurethane into an excess of n-hexane.

* * * * *